US008033913B2

(12) United States Patent
Cockerille et al.

(10) Patent No.: US 8,033,913 B2
(45) Date of Patent: Oct. 11, 2011

(54) GAMING MACHINE UPDATE AND MASS STORAGE MANAGEMENT

(75) Inventors: Warner Cockerille, Sparks, NV (US); Xuedong Chen, Reno, NV (US); Steven LeMay, Reno, NV (US); Robert Breckner, Reno, NV (US); Dwayne Nelson, Las Vegas, NV (US); William Brosnan, Reno, NV (US); Paul Bolton, Reno, NV (US)

(73) Assignee: IGT, Reno, NV (US)

( * ) Notice: Subject to any disclaimer, the term of this patent is extended or adjusted under 35 U.S.C. 154(b) by 1495 days.

(21) Appl. No.: 11/223,755

(22) Filed: Sep. 9, 2005

(65) Prior Publication Data

US 2006/0035713 A1 Feb. 16, 2006

Related U.S. Application Data

(63) Continuation-in-part of application No. 10/397,621, filed on Mar. 26, 2003, now Pat. No. 6,988,267, which is a continuation of application No. 09/586,522, filed on Jun. 2, 2000, now abandoned.

(60) Provisional application No. 60/137,352, filed on Jun. 3, 1999.

(51) Int. Cl.
*A63F 9/24* (2006.01)
*A63F 13/00* (2006.01)

(52) U.S. Cl. ................. 463/29; 463/20; 463/25; 463/42

(58) Field of Classification Search .................... 463/16, 463/40, 42; 709/221, 222
See application file for complete search history.

(56) References Cited

U.S. PATENT DOCUMENTS 5,136,644 A 8/1992 Audebert et al.
5,155,837 A 10/1992 Liu et al.
5,282,897 A * 2/1994 Bugnon et al. ................ 106/437
5,410,703 A 4/1995 Nilsson et al.
5,421,009 A 5/1995 Platt
5,421,017 A 5/1995 Scholz et al.
5,473,772 A 12/1995 Halliwell et al.
5,530,943 A * 6/1996 Gericke et al. .................... 713/2
(Continued)

FOREIGN PATENT DOCUMENTS

CA 2375701 8/2010
(Continued)

OTHER PUBLICATIONS

International Search Report, PCT/US2006/034363, dated Feb. 6, 2007.

(Continued)

*Primary Examiner* — Dmitry Suhol
*Assistant Examiner* — Ryan Hsu
(74) *Attorney, Agent, or Firm* — Weaver Austin Villeneuve & Sampson LLP

(57) ABSTRACT

Different mechanisms are provided to enable a gaming machine to download files/images, move/copy the files/images from one folder to another without breaking authentication, and resume interrupted file manipulation operations such as move/copy operations and/or download operations which have been interrupted by a power hit. In this way, the technique of the present invention is able to provide a self-diagnostic system for ensuring authenticated, atomic transactions, and for automatically handling detected error conditions. Additionally the technique of the present invention is able to provide a mechanism for seamlessly updating gaming machine components at runtime. This may include, for example, the automatic mounting and/or unmounting of selected games to/from the gaming machine memory during runtime.

53 Claims, 17 Drawing Sheets

U.S. PATENT DOCUMENTS

| | | | | |
|---|---|---|---|---|
| 5,555,418 | A * | 9/1996 | Nilsson et al. | 717/153 |
| 5,586,304 | A * | 12/1996 | Stupek et al. | 717/170 |
| 5,643,086 | A | 7/1997 | Alcorn et al. | |
| 5,654,746 | A | 8/1997 | McMullan, Jr. et al. | |
| 5,655,961 | A | 8/1997 | Acres et al. | |
| 5,682,533 | A | 10/1997 | Siljestroemer | |
| 5,715,462 | A | 2/1998 | Iwamoto et al. | |
| 5,759,102 | A | 6/1998 | Pease et al. | |
| 5,845,077 | A | 12/1998 | Fawcett | |
| 5,845,090 | A | 12/1998 | Collins et al. | |
| 5,848,064 | A | 12/1998 | Cowan | |
| 5,870,723 | A | 2/1999 | Pare, Jr. et al. | |
| 5,885,158 | A | 3/1999 | Torango et al. | |
| 5,896,566 | A | 4/1999 | Averbuch et al. | |
| 5,905,523 | A | 5/1999 | Woodfield et al. | |
| 5,960,189 | A * | 9/1999 | Stupek et al. | 717/169 |
| 5,970,143 | A | 10/1999 | Schneier | |
| 6,006,034 | A | 12/1999 | Heath et al. | |
| 6,029,046 | A | 2/2000 | Khan et al. | |
| 6,047,128 | A | 4/2000 | Zander | |
| 6,104,815 | A | 8/2000 | Alcorn et al. | |
| 6,138,153 | A * | 10/2000 | Collins et al. | 709/221 |
| 6,149,522 | A | 11/2000 | Alcorn et al. | |
| 6,154,878 | A | 11/2000 | Saboff | |
| 6,219,836 | B1 * | 4/2001 | Wells et al. | 717/178 |
| 6,264,561 | B1 | 7/2001 | Saffari | |
| 6,317,827 | B1 | 11/2001 | Cooper | |
| 6,347,396 | B1 * | 2/2002 | Gard et al. | 717/168 |
| 6,488,585 | B1 | 12/2002 | Wells et al. | |
| 6,544,126 | B2 * | 4/2003 | Sawano et al. | 463/42 |
| 6,615,404 | B1 | 9/2003 | Garfunkel et al. | |
| 6,620,047 | B1 | 9/2003 | Alcorn et al. | |
| 6,645,077 | B2 * | 11/2003 | Rowe | 463/42 |
| 6,682,423 | B2 | 1/2004 | Brosnan et al. | |
| 6,685,567 | B2 | 2/2004 | Cockerille et al. | |
| 6,712,698 | B2 | 3/2004 | Paulsen et al. | |
| 6,779,176 | B1 * | 8/2004 | Chambers et al. | 717/169 |
| 6,800,029 | B2 | 10/2004 | Rowe et al. | |
| 6,804,763 | B1 | 10/2004 | Stockdale et al. | |
| 6,805,634 | B1 | 10/2004 | Wells et al. | |
| 6,863,608 | B1 | 3/2005 | LeMay et al. | |
| 6,988,267 | B2 | 1/2006 | Harris et al. | |
| 7,203,937 | B1 * | 4/2007 | Kyle et al. | 717/168 |
| 7,454,547 | B1 * | 11/2008 | Nallagatla et al. | 717/168 |
| 7,470,182 | B2 * | 12/2008 | Martinek et al. | 463/16 |
| 7,515,718 | B2 | 4/2009 | Nguyen et al. | |
| 7,827,215 | B2 * | 11/2010 | Chao et al. | 707/827 |
| 2002/0137217 | A1 | 9/2002 | Rowe | |
| 2003/0054881 | A1 | 3/2003 | Hedrick et al. | |
| 2003/0064771 | A1 | 4/2003 | Morrow et al. | |
| 2003/0073497 | A1 | 4/2003 | Nelson | |
| 2003/0078103 | A1 | 4/2003 | LeMay et al. | |
| 2003/0188306 | A1 | 10/2003 | Harris et al. | |
| 2003/0203756 | A1 | 10/2003 | Jackson | |
| 2004/0002385 | A1 | 1/2004 | Nguyen | |
| 2004/0048667 | A1 | 3/2004 | Rowe | |
| 2004/0147314 | A1 | 7/2004 | LeMay | |
| 2005/0192099 | A1 | 9/2005 | Nguyen et al. | |
| 2006/0031829 | A1 | 2/2006 | Harris et al. | |
| 2006/0035713 | A1 | 2/2006 | Cockerille et al. | |

FOREIGN PATENT DOCUMENTS

| | | | |
|---|---|---|---|
| EP | 0689 325 | | 12/1995 |
| EP | 0689325 | | 12/1995 |
| EP | 0706275 | | 4/1996 |
| EP | 0706 275 | | 10/1996 |
| EP | 0841 615 | | 5/1998 |
| EP | 0841615 | | 5/1998 |
| EP | 0905614 | | 3/1999 |
| EP | 1004 970 | | 5/2000 |
| EP | 0905 614 | | 12/2004 |
| EP | 1929448 | | 6/2008 |
| WO | WO 01/20424 | A2 | 3/2001 |
| WO | WO 01/20424 | A3 | 3/2001 |
| WO | WO 2004/025655 | | 3/2004 |
| WO | WO 2007/032943 | A1 | 3/2007 |

OTHER PUBLICATIONS

Harris et al., U.S. Appl. No. 09/586,522, filed Jun. 2, 2000.
Hauptmann, Steffen et al., "On-line Maintenance With On-The-Fly Software Replacement" Copyright 1996 IEEE Proceedings, Third International Conference on Configurable Distributed Systems, (pp. 70-80) 0-8186-7395-8/96.
Higaki, Hiroaki, "Group Communications Algorithm for Dynamically Updating in Distributed Systems" Copyright 1994 IEEE International Conference on Parallel and Distributed Systems (pp. 56-62) 08-8186-655-6/94, higaki@sdesun.slab.ntt.jp.
Higaki, Hiroaki, "Extended Group Communication Algorithm for Updating Distributed Programs" Copyright 1996, IEEE, International Conference on Parallel and Distributed Systems, 0-8186-7267-6/96, hig@takilab.k.dendai.as.jp.
International Search Report dated Feb. 21, 2001 issued in PCT/US00/15078 4 pgs.
International Search Report and Written Opinion dated Feb. 6, 2007 issued in PCT/US2006/034363.
PCT Preliminary Report on Patentability and Written Opinion dated Mar. 11, 2008 issued in PCT/US2006/034363.
Canadian Office Action dated Oct. 6, 2008 issued in 2,375,701.
European Office Action dated Oct. 18, 2004 issued in 00987948.7.
European Office Action dated Aug. 19, 2005 issued in 00987948.7.
European Office Action dated Aug. 16, 2006 issued in 00987948.7.
European Office Action dated Jul. 15, 2008 issued in 06802879.4.
First Polish Office Action dated Jul. 2008 issued in 351957.
Second Polish Office Action dated Dec. 2008 issued in 351957.
Third Polish Office Action dated Jun. 22, 2009 issued in 351957.
Australian Examination Report dated Nov. 18, 2010, AU Application No. 2006291263.
Chinese First Office Action dated Nov. 20, 2009, CN Application No. 200678003701.7.
European Examination Report dated Sep. 17, 2009, EP Application No. 06 802 879.4- 2221.
European Summons Oral Proceedings, EP Patent Application No. 06802879 issued Feb. 18, 2011.

* cited by examiner

GAMING MACHINE UPDATE AND MASS STORAGE MANAGEMENT

RELATED APPLICATION DATA

This application is a continuation-in-part of prior U.S. patent application Ser. No. 10/397,621 entitled "METHOD AND DEVICE FOR IMPLEMENTING A DOWNLOADABLE SOFTWARE DELIVERY SYSTEM" by Harris et al., filed on Mar. 26, 2003 now U.S. Pat. No. 6,988,267, which is a continuation of U.S. patent application Ser. No. 09/586,522 entitled "METHOD AND DEVICE IMPLEMENTING A DOWNLOADABLE SOFTWARE DELIVERY SYSTEM" by Harris et al., filed on Jun. 2, 2000 now abandoned, which claims benefit of U.S. Provisional Application Ser. No. 60/137,352, naming Harris et al. as inventors, and filed Jun. 3, 1999. Priority is hereby claimed pursuant to the provisions of 35 U.S.C. §120, and 35 U.S.C. §119(e), as appropriate. Each of these applications is incorporated herein by reference in its entirety and for all purposes.

BACKGROUND OF THE INVENTION

This invention relates to gaming machines such as slot machines and video poker machines. More particularly, the present invention relates to a technique for implementing a downloadable software system for an electronic gaming machine communications network.

In general, conventional gaming machine networks typically include a central system operatively connected to one or more individual gaming machines via intermediate communication site controllers. Although the gaming machines communicate with the central system, each gaming machine or site controller contains a central chipset which locally stores the computer code to be is executed by the device to perform gaming related functions. These chipsets typically include electronic programmable read only memory (EPROM) which permanently store the computer code. EPROM chipsets are conventionally preferred because the electronic memory can be controlled in a secured manner without giving unauthorized access to the gaming machine code. Additionally, in many conventional gaming machine implementations, the gaming machine file systems have been designed and signed to meet stringent authentication and other security requirements. As a result, such file systems are typically implemented as fixed, read-only file systems. There is typically no need for implementing any type of file system management component (e.g., during initialization and/or runtime) for such file systems.

While such gaming machine implementations may provide one approach for minimizing security risks, such implementations do not offer flexibility with regard to configuring or reconfiguring gaming machine code. For example, in the event the gaming machine software code needs to be upgraded, service personnel are required to manually change the chipset for each gaming machine and/or site controller.

Because a service technician must perform the same operation for each machine or controller, the current method of updating gaming machine/site controller or gaming machine software typically takes a long time to accomplish at a substantial cost, including the cost of the technician time and the cost of a new chipset for each machine.

In light of the above, it will be appreciated that there exist a need for improving conventional techniques for dynamically updating or modifying gaming machine components.

SUMMARY OF THE INVENTION

Various aspects of the present invention are directed to different methods, systems, and computer program products for facilitating dynamic configuration of a gaming machine configured or designed to receive a wager on a game of chance. A first game is mounted into the memory of the gaming machine during runtime of the gaming machine. Game mounting instructions are received for mounting a second game into the gaming machine memory. In response to the game mounting instruction, a second game is automatically mounted into the gaming machine memory. In at least one implementation, the mounting of the second game may occur during runtime of the gaming machine. Additionally, in at least one implementation the first and second games may concurrently mounted into the gaming machine memory. In another implementation, game unmounting instructions may be received for unmounting the first game from the gaming machine memory. In response to the game unmounting instructions, the first game may be automatically unmounted from the gaming machine memory. According to different embodiments, the gaming machine may be configured or designed to dynamically mount and/or unmount selected games during runtime, without requiring a reboot of the operating system. Additionally, in at least one embodiment, the mounting and/or unmounting of selected games may be performed while preserving desired accumulated system data (such as, for example, historical game data, accounting meter data, etc.)

Other aspects of the present invention are directed to different methods, systems, and computer program products for facilitating dynamic configuration of a gaming machine configured or designed to receive a wager on a game of chance. A first game is mounted into memory of the gaming machine during runtime of the gaming machine. Game unmounting instructions are received for unmounting the first game from the gaming machine memory in response to the game unmounting instructions, the first game may be automatically unmounted from the gaming machine memory. According to a specific embodiment, the unmounting of the first game may occur during runtime of the gaming machine.

Additional aspects of the present invention are directed to different methods, systems, and computer program products for facilitating dynamic configuration of a gaming machine configured or designed to receive a wager on a game of chance. A first image is downloaded from a remote server. The first image includes a first portion of update information to be used for updating system-related information stored at the gaming machine. The downloaded first image is stored in memory at the gaming machine. During runtime of the gaming machine, a first portion of the system-related information may be automatically and/or dynamically updated using the first portion of update information. According to a specific embodiment, the first portion of system-related information is used for initializing at least one system-related component of the gaming machine, and the updating of the first portion of system-related information results in an update of the at least one system-related component.

Another aspect of the present invention is directed to different methods, systems, and computer program products for automatically handling detected error conditions relating to one or more downloaded files/images. For example, when an error relating to a downloaded image is detected, a determination may be made as to whether the cause of the first error relates to an incomplete transaction associated with the downloaded image. In response, a first error handling response may be automatically initiated in response to the detecting of the first error. According to a specific embodiment, the first error handling response may include initiating completion of the of the incomplete transaction associated with the downloaded first image.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not obscure the present invention.

The present invention enables a central system operatively connected to a plurality of gaming machines and site controllers (or PC's) to upgrade one or more software images via a communications link without requiring a manual change of the device chipset.

Figure 1:
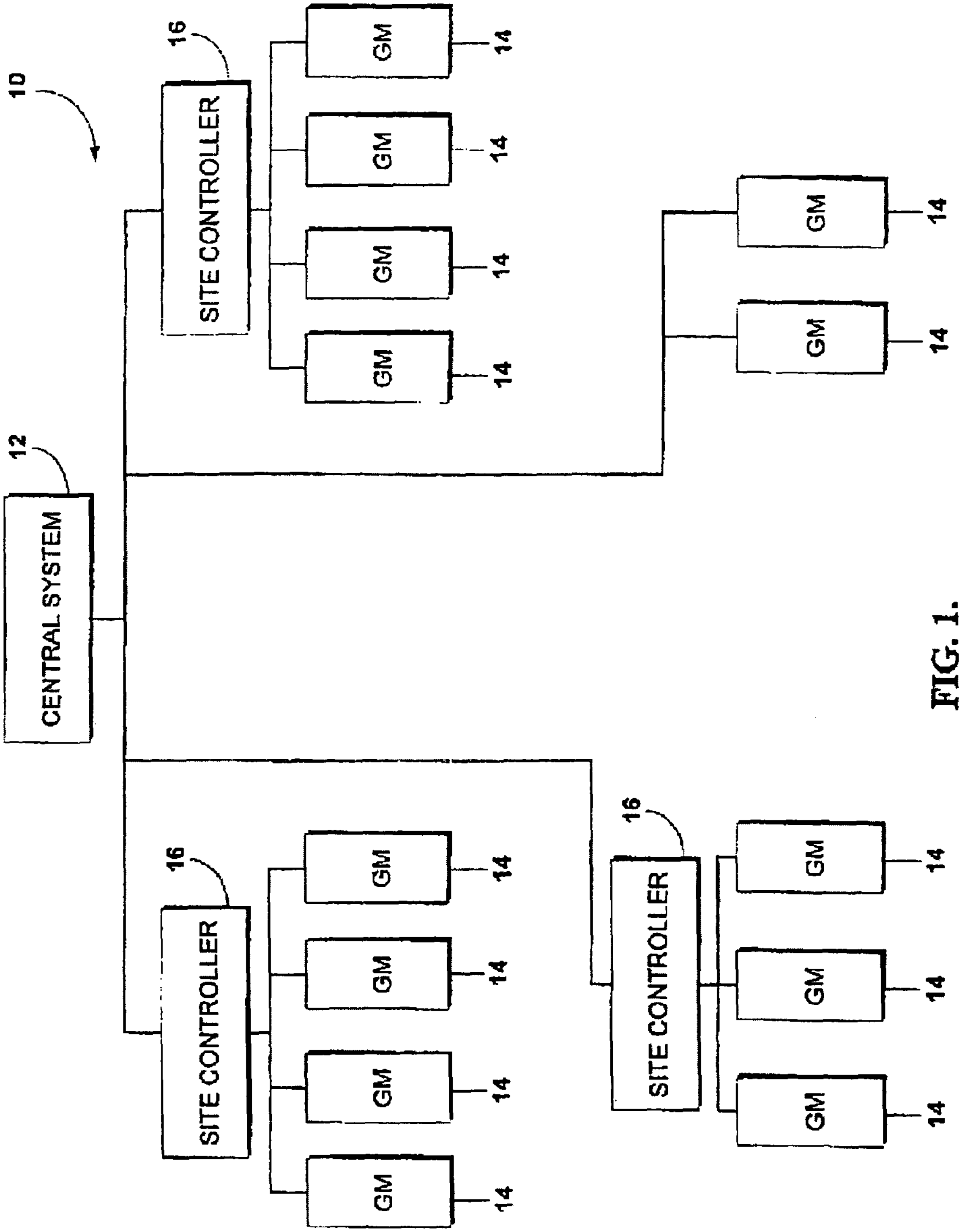
FIG. 1 is a block diagram of a gaming machine network utilized in accordance with the present invention.

FIG. 1 is block diagram illustrative of a gaming machine network operable to be utilized by the present invention, designated generally by the reference numeral 10. Generally, the gaming machine network 10 includes a central system 12 operatively connected to a number of gaming machines 14 either by a direct communication link to each individual machine 14 or indirectly through the one or more site controllers or PC's 16. The connectivity of the central system 12 to the gaming machines 14 can include continuous, on-line communication systems, including local area networks and/or wide area networks, or may be periodic, dial up semi-continuous communications. Because many gaming machine network currently utilize some type of communication network, the present invention preferably utilizes the preestablished communication system between the central system and the gaming machines such as through telephone, cable, radio or satellite links. However, a dedicated software delivery communication network may also be implemented and is considered to be within the scope of the present invention.

Figure 2:
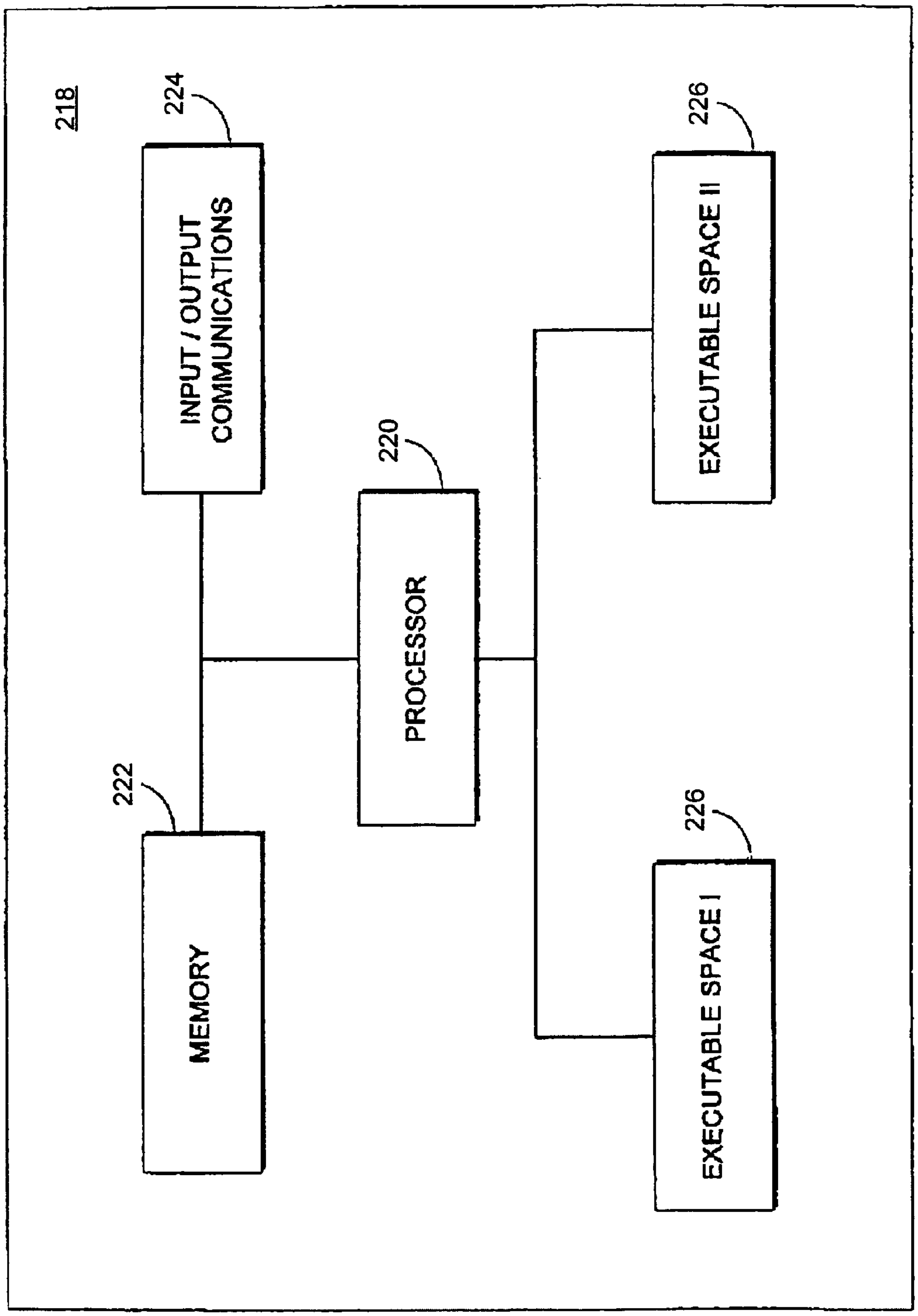
FIG. 2 is a block diagram illustrative of various device components utilized in accordance with the present invention.

FIG. 2 is a block diagram illustrative of some of the components common to the gaming machines 14, site controllers 16 or other networked device (FIG. 1), generally referred to as a device 218, utilized in the present invention. Each device 218 preferably contains a processor 220, a memory 222, a communications input/output 224, such as a modem or network card, and at least two executable spaces 226. As would be readily understood by one skilled in the relevant art, the processor 220, memory 222 and communications input/output 224 includes any variety of component generally utilized in the implementation of the device. Moreover, in one embodiment, one or more of the executable spaces 226 are FLASH ROM. However, as would be readily understood, the executable spaces 226 may include an optical storage device (e.g., DVD, CD-ROM), battery backed RAM and/or any other nonvolatile memory storage device.

Preferably, one executable space 226 is typically designated to store the software code, or image, currently being executed by the device 218. The other executable space is typically designated to receive a new image transferred by the central system. As would be understood, although the two executable spaces are preferably separate, the same effect is accomplished through the use of a single, larger executable space. In this embodiment, each device uses a portion of the executable space 226 to assist in receiving and storing incoming images from the central system.

As an alternative embodiment, the present invention may also be implemented with one executable space and sufficient other memory, which can include memory 222, to temporarily store a downloaded image. In this embodiment, the image would be downloaded to the temporary memory and then transferred to the more permanent executable space 226.

Generally, the present invention facilitates the implementation and replacement of a software image on a device in a gaming machine network by allowing the transmittal of a new image to a device while the device continues to execute and/or process a previous software image. Additionally, because the present invention may utilize one or more existing communication lines, the transfer of a new image can include various security and error checking features to ensure and preserve the secured character of the executable code.

Figure 3A:
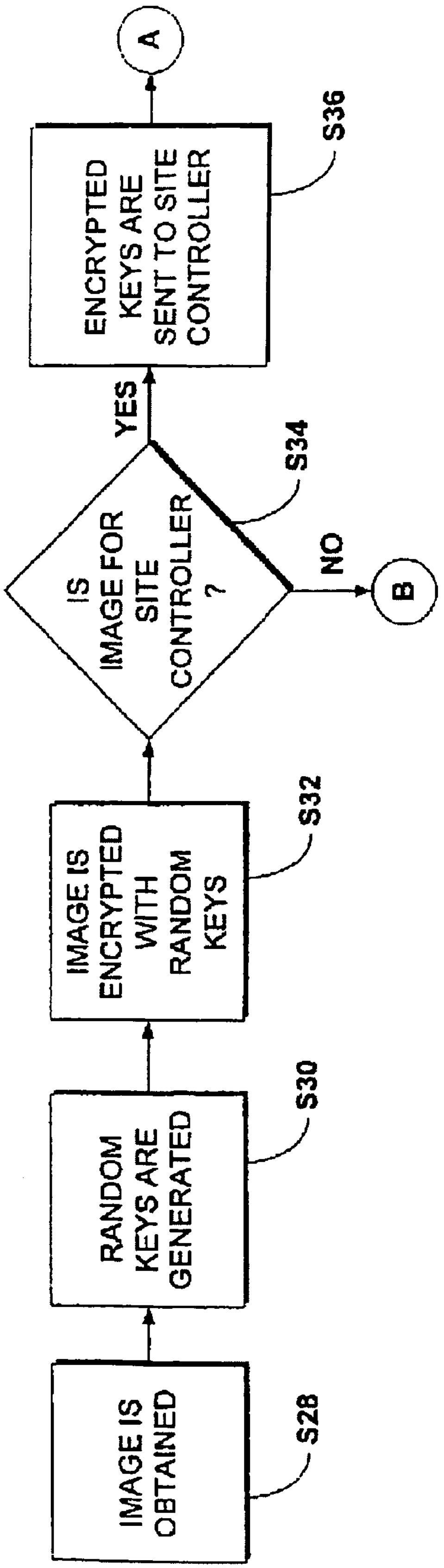
FIGS. 3A, 3B & 3C are flow diagrams illustrative of a software image transfer method utilizing random key encryption in accordance with the present invention.
Figure 3B:
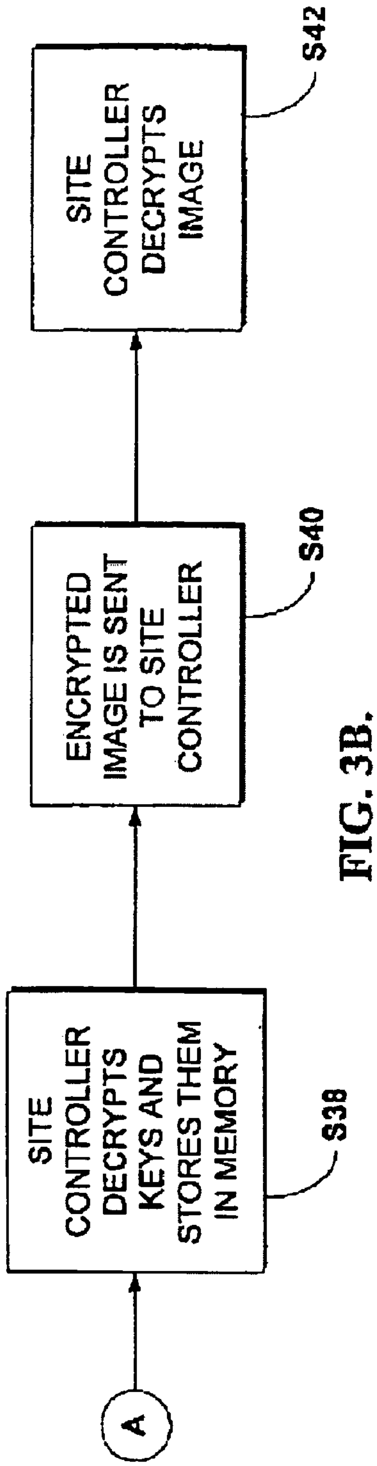
Figure 3C:
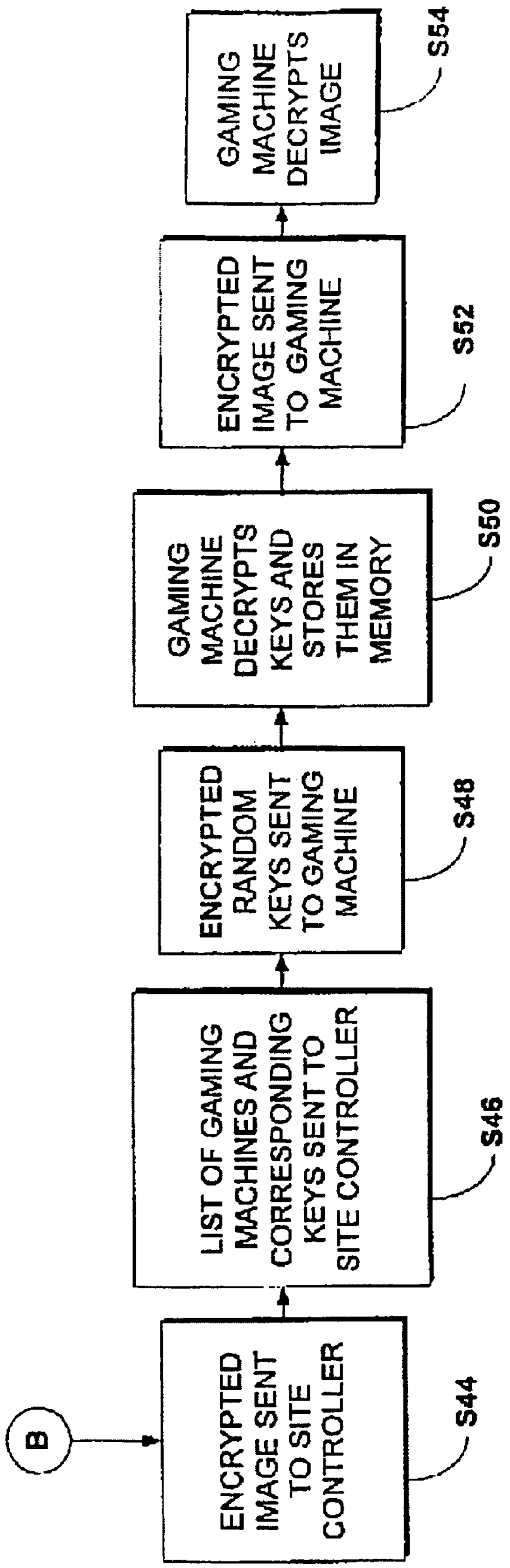

FIGS. 3A, 3B & 3C are flow diagrams of an image downloading process utilizing a random key encryption in accordance with the present invention. With reference to FIG. 3A, at S28, the desired image to be downloaded is created, and loaded into the central system. Preferably, the operating system of the central system provides a user interface, such as a graphical user interface, that allows a user to download the image to the central system's memory. Additionally, the user interface can include prompts for a user to enter additional information needed for the downloading process including download time information, download windows and version numbers. As would be understood, depending on the function of the image being downloaded, the additional information needed to complete the download will vary.

Once the image has been downloaded to the central system, the user selects which devices are to receive the image. The user selection can include all of the devices or subsets of devices. Preferably, the central system includes some form of error checking that ensures that the designated device is compatible with the image to be downloaded. At S30, the central system generates a random encryption key for each device designated to receive the image and encrypts the image with each of the random keys at S32. The random keys and encrypted images are stored in the central system memory. Additionally, the central system stores a completed, unencrypted version of the image in memory to use a signature for verification that the download is complete.

Generally, the function of a site controller (or PC) download differs from the function of the gaming machine download. Accordingly, at S34 a determination of whether the download is for a site controller is made. With reference to FIGS. 3A & 3B, if at S34 the desired image is designated to be downloaded to a site controller or PC, the random keys used to encrypt the image are themselves encrypted with a general encryption key and sent to the site controller at S36. At S38, the site controller or PC decrypts the random keys and stores the keys in a memory, such as memory 222 (FIG. 2). The central system then sends the random key encrypted message to the site controller at S40. Once the download is complete, the central system sends additional instructions to the site controller such as to decrypt the image with the stored random keys or to store the image into its second executable space.

With reference to FIGS. 3A & 3C, if at S34, the desired image is designated to be downloaded to a gaming machine or other device, the central system sends the encrypted message to the site controller (or PC) associated with the particular gaming machine at S44, preferably in a manner as described above in steps S36-S42. At S46, the central system sends the site controller a list of the gaming machines to receive the image and their preassigned general encryption keys, which are encrypted with a key known to the gaming machine. At S48, the site controller transfers the encryption keys to the gaming machine, which decrypts and stores the random keys in memory. The site controller then sends the random key encrypted image to the gaming machine at S50. Once the download is complete, the central system instructs the gaming machine, via the site controller, to prepare and store the image into its second executable space at S54.

Figure 4A:
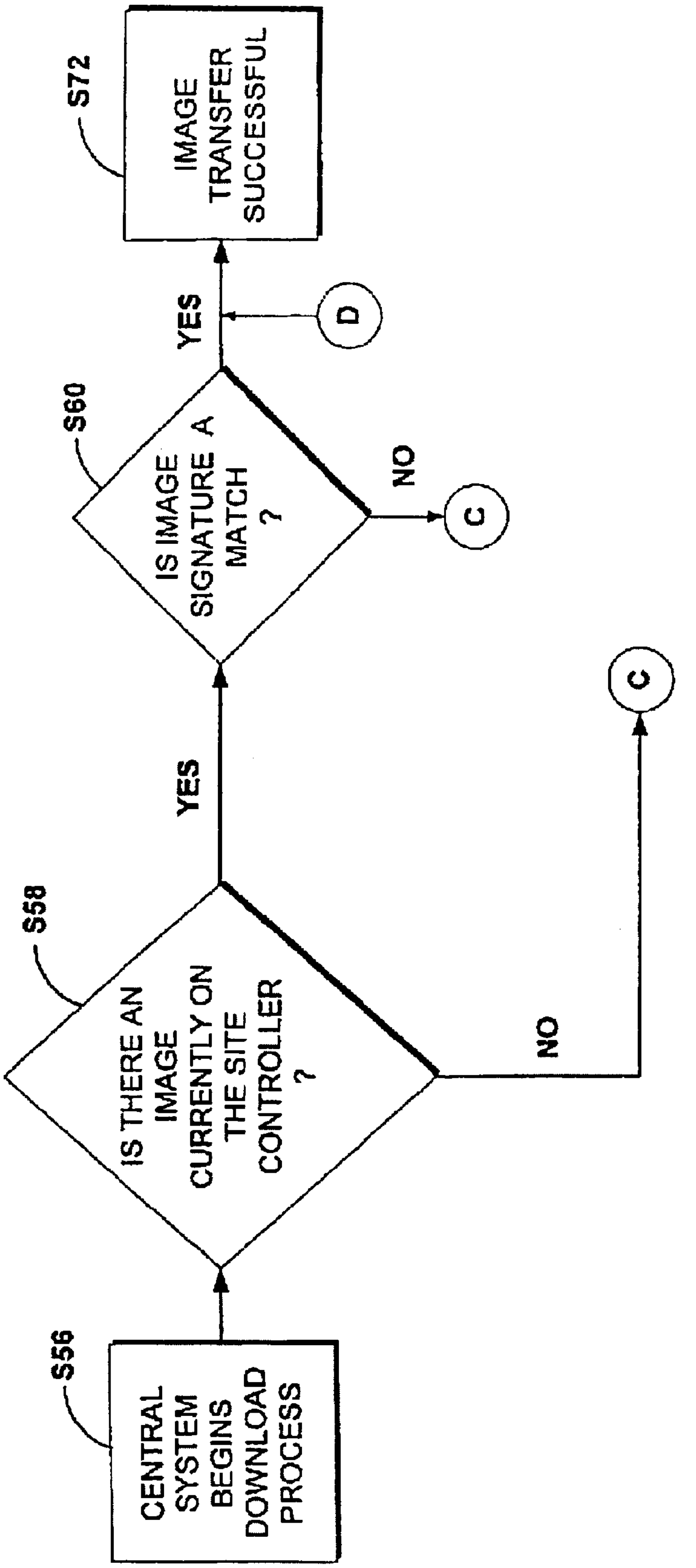
FIGS. 4A & 4B are flow diagrams illustrative of an image transfer error checking and bypass process in accordance with the present invention.
Figure 4B:
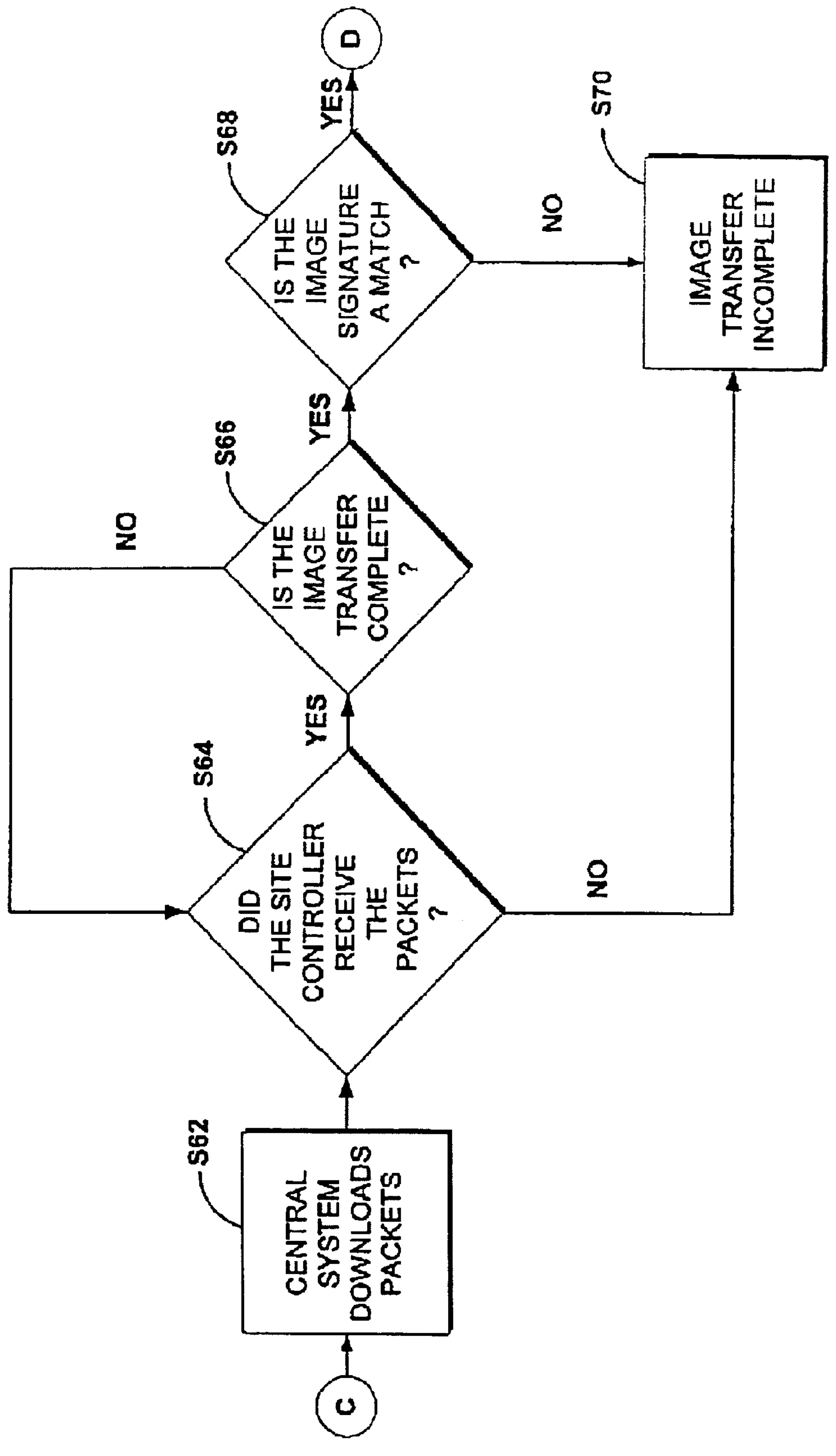

With reference to FIGS. 4A & 4B, the present invention implements a bypass and error checking function between the central system and the site controller or PC. Because the site controller can be associated with a number of gaming machines or other devices, once the site controller stores the image into its executable space, it does not need to reexecute the downloading step for each subsequent transfer to a gaming machine. With reference to FIG. 4A, the central system begins the download process each time an image is to be transferred to a device as illustrated at S56. At S58, the central system checks whether a downloaded image has already been stored in the site controller's executable space. If so, at S60, the central system verifies that the signature of the image loaded on the site controller is correct and the transfer is complete at S72. With reference to FIGS. 4A & 4B if an image is not present in the site controller's executable space at S58 or if the signature does not match at S60, the central system sends the image via packets to the site controller or PC at S62.

Preferably, the central system relies on package acknowledge signals from the site controller to ensure that each individual packet is received by the site controller. Accordingly, at S64, the central system determines whether all the packets have been received. If one or more package acknowledge signals are not received, the transfer is incomplete at S70. At this point, the central system may resend the individual packets not received or may attempt to resend the entire image. Alternatively, the central system may just declare the transfer a failure.

If the packets are received and acknowledged at S64, the central system completes the transfer at S66. At S68, the central system requests a signature of the image from the site controller to verify a proper transmission and decryption. With reference to FIGS. 4A & 4B, if the signature is a match, the download is a success at S72 and the site controller implements any downloading instruction. If the signature is not a match, the transfer is incomplete at S70.

Figure 5:
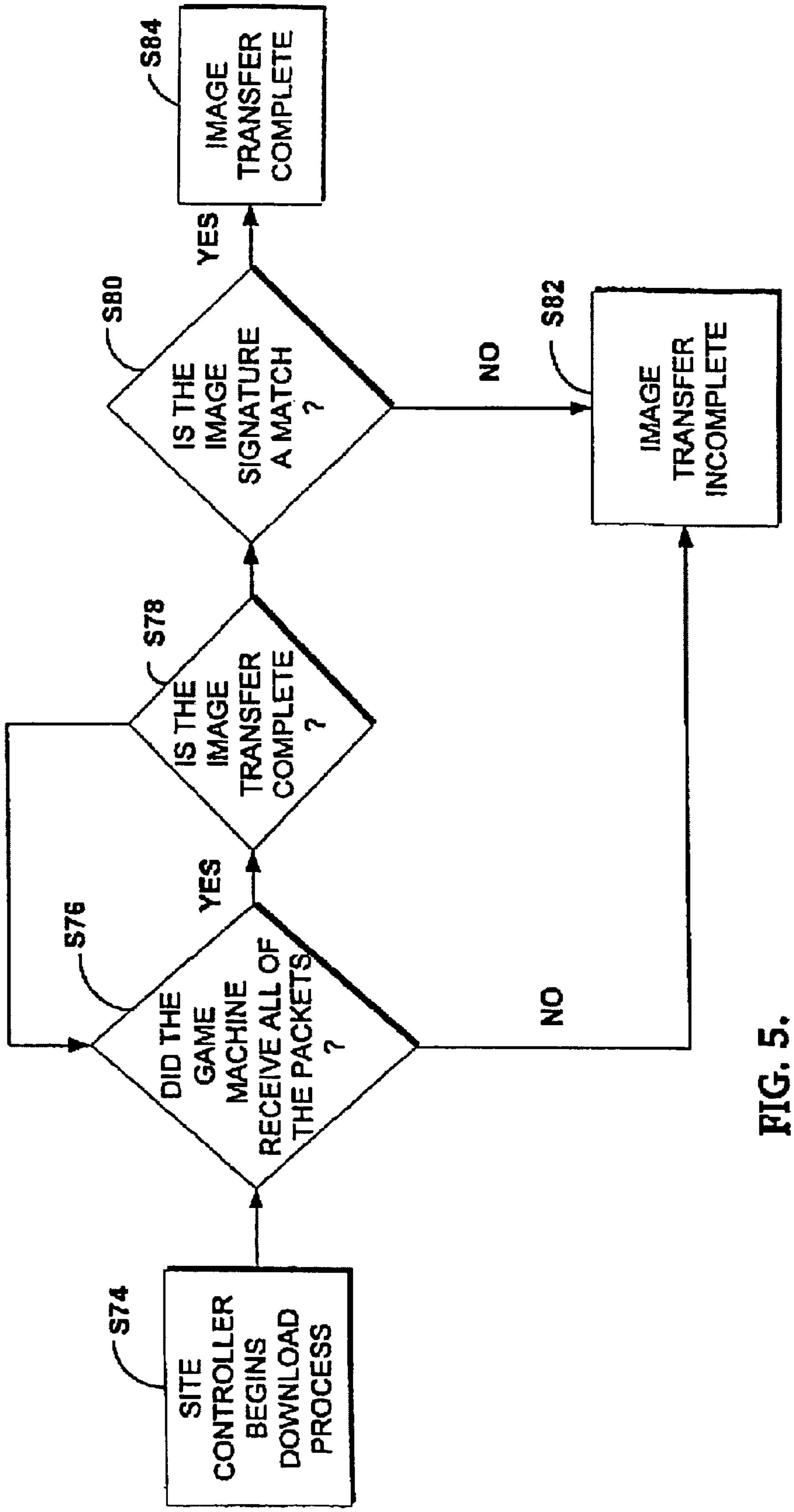
FIG. 5 is a flow diagram illustrative of a software image transfer method to a gaming machine in accordance with the present invention.
Figure 6:
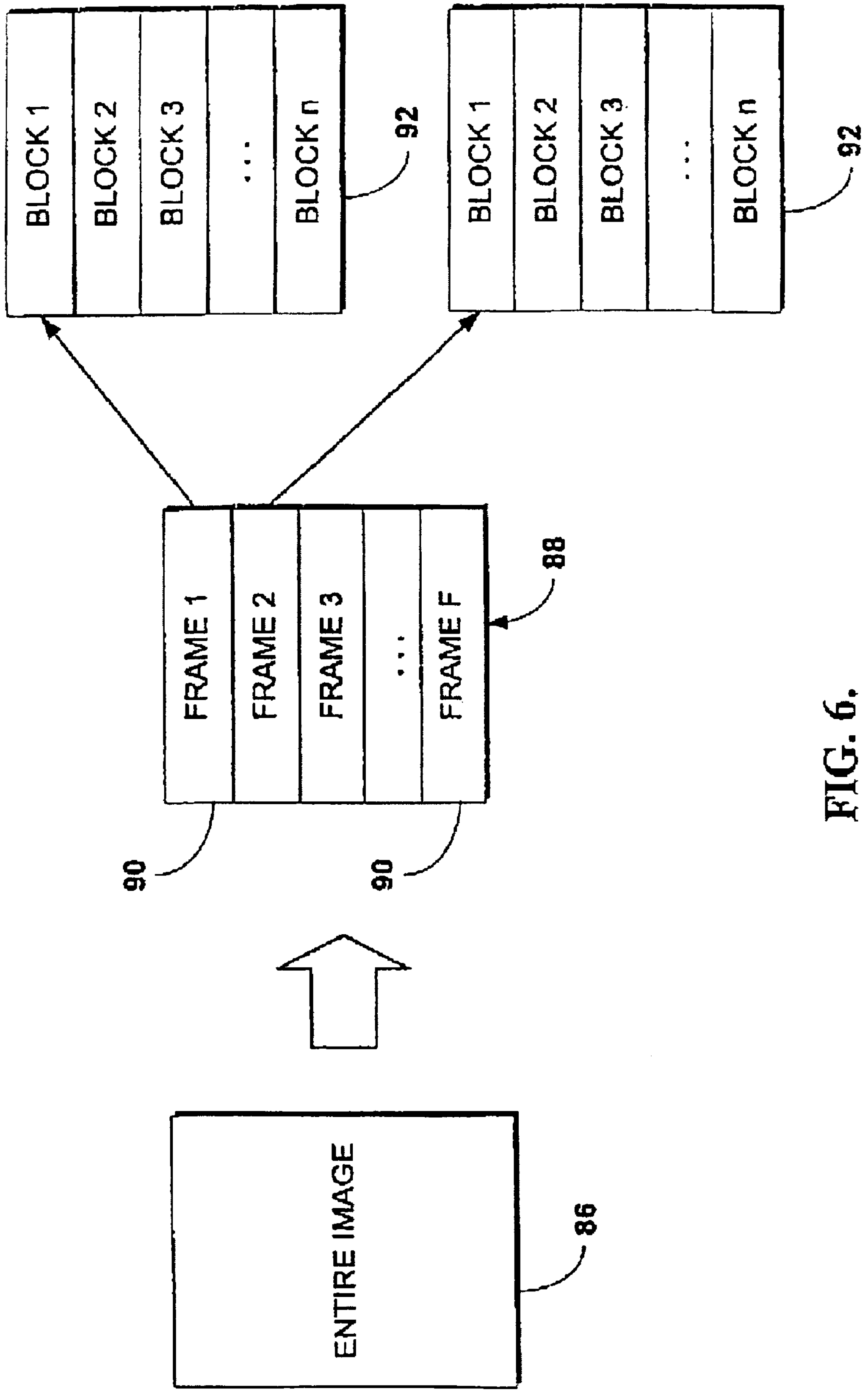
FIG. 6 is a block diagram illustrative of a software image parsing embodiment in accordance with the present invention.

With reference to FIG. 5, the present invention also implements an error transfer method for the downloading of an image from the site controller to the gaming machine. Upon receiving and storing the downloaded image in memory, the site controller (or PC) begins the download to the gaming machine at S74. Preferably as illustrated in FIG. 6, the software image 86 is organized into one or more frames 88 which are further organized into one ore more blocks 92 per frame. Each of the blocks 92 can then be transferred as individual communication packets. During the download process, site controller transfers all packets that make up the frame with reference again to FIG. 5, at the end of the transfer frame the site controller requests an acknowledgment from the gaming machine at S70.

If the gaming machine did not receive some portion of the frame, the transfer is incomplete at S82. The site controller preferably resends only those packets which are incomplete. Alternatively, the entire image may be resent or the transfer may be declared a failure. Accordingly, the gaming machine does not need to acknowledge receipt of each packet. As would be understood, however, alternative methods of grouping and sending the software image would be considered within the scope of the present invention.

Upon the transfer of the entire image to the gaming machine at S78, the central system requests an image signature to verify the transfer was successful at S80. If the signature is a match, the transfer is successful at S84. If the image is not a match, the image is incomplete at S82.

The above-described transfer protocols have been incorporated with reference to examples of two separate encryption methods. As would be understood, a system implementing only a portion, different or no encryption methods would also be considered within the scope of the present invention.

Once the image has been successfully transferred to the device, the image can be executed. Preferably, the central system sends a command to the device to begin using the new image in the executable space. This command typically includes separate instructions for configuring the system to accommodate the new image and preventing the future play of the current image while the switch is occurring. Upon the completion of the command, the device begins executing the new image and the switch is complete.

Because the device contains at least two separate executable spaces, the old image previously being executed remains in the device executable space after the switch is complete. In the event that the new image is corrupt or not functioning properly, the central system can execute a command to revert to the old image if it is still available and intact.

Although the devices specifically referenced in the present application refer solely to gaming machines or site controllers or PCs, the present invention allows images to be transferred to any device that is configured to receive an image. Such devices could include peripheral devices such as printers and bill acceptors or other intermediate communications devices. As would be understood, the images associated with each device would vary with the type of device and its function in the system.

Gaming Machine

Figure 7:
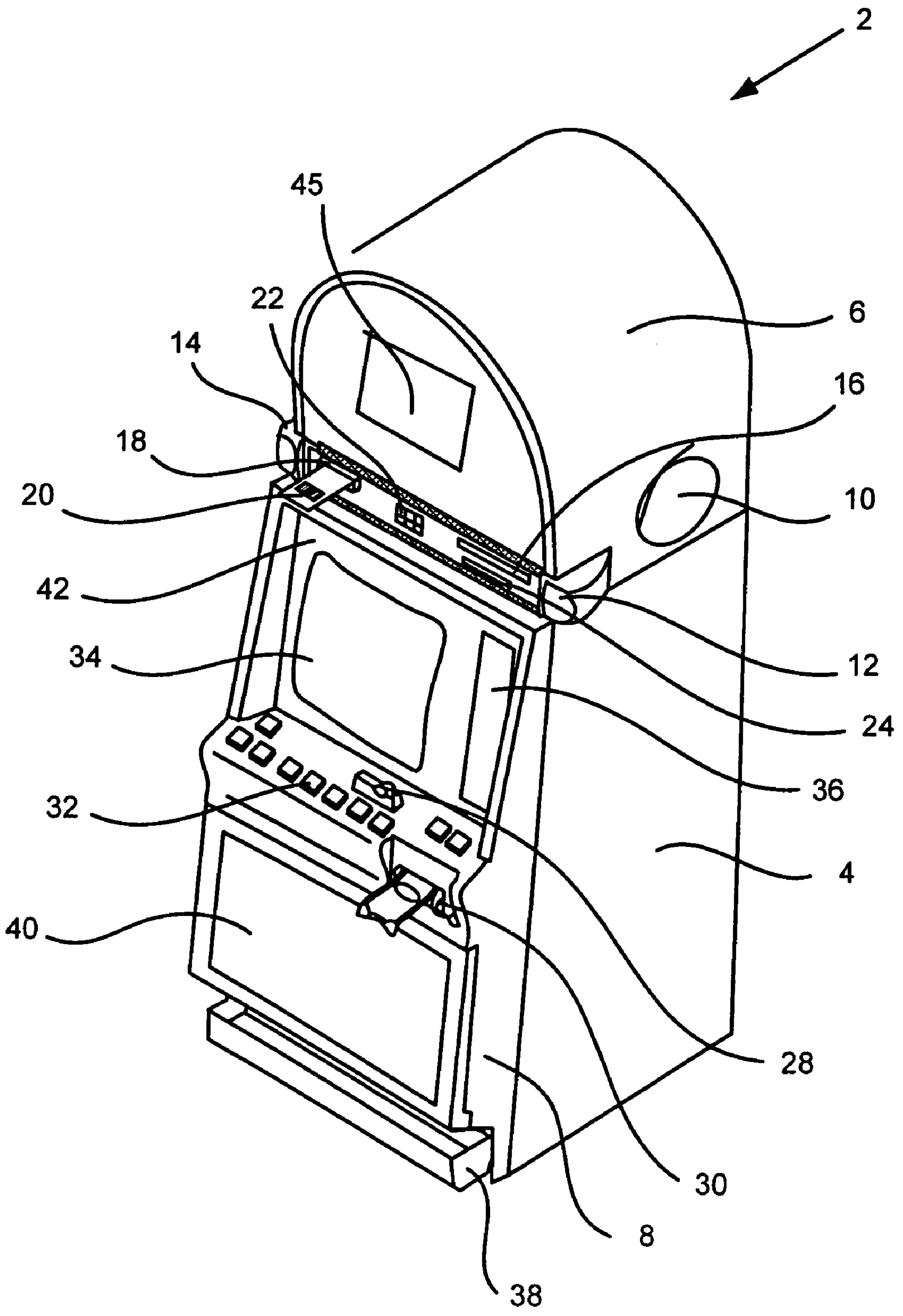
FIG. 7 shows a perspective view of an exemplary gaming machine 2 in accordance with a specific embodiment of the present invention.

FIG. 7 shows a perspective view of an exemplary gaming machine 2 in accordance with a specific embodiment of the present invention. As illustrated in the example of FIG. 7, machine 2 includes a main cabinet 4, which generally surrounds the machine interior (illustrated, for example, in FIG. 3) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. According to a specific embodiment, the devices may be controlled by code executed by a master gaming controller housed inside the main cabinet 4 of the machine 2. In specific embodiments where it may be required that the code be periodically configured and/or authenticated in a secure manner, the technique of the present invention may be used for accomplishing such tasks.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

As illustrated in the example of FIG. 7, the gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices not illustrated in FIG. 7. For example, the top box may include a bonus wheel or a back-lit silk screened panel which may be used to add bonus features to the game being played on the gaming machine. As another example, the top box may include a display for a progressive jackpot offered on the gaming machine. During a game, these devices are controlled and powered, in part, by circuitry (e.g. a master gaming controller) housed within the main cabinet 4 of the machine 2.

It will be appreciated that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to “re-trigger” the watchdog. Should the operating software fail to access the control registers within a preset timeframe, the watchdog timer will timeout and generate a system reset. Typical watchdog timer circuits include a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaining machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

Another feature of gaming machines, such as IGT gaming computers, is that they often include unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices and/or trusted memory sources are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms included in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities. Details of zero knowledge proofs that may be used with the present invention are described in U.S. publication No. 2003/0203756, by Jackson, filed on Apr. 25, 2002 and entitled, "Authentication in a Secure Computerized Gaming System", which is incorporated herein in its entirety and for all purposes.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "SECURED VIRTUAL NETWORK IN A GAMING ENVIRONMENT", naming Nguyen et al. as inventors, filed on Mar. 10, 2005, herein incorporated in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

Returning to the example of FIG. 7, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 45 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 8:
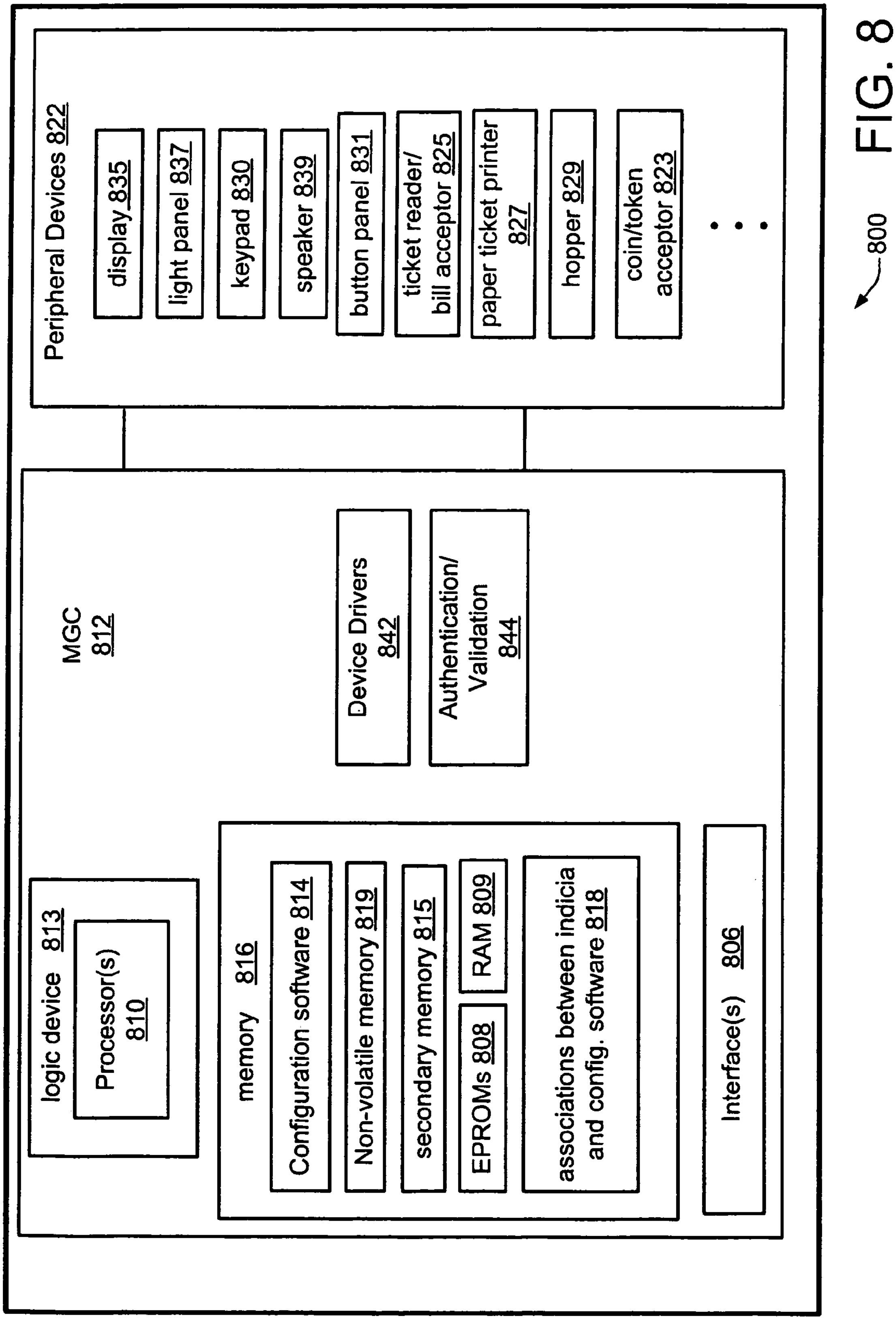
FIG. 8 is a simplified block diagram of an embodiment of gaming machine 2 showing processing portions of a configuration/reconfiguration system in accordance with the present invention.

FIG. 8 is a simplified block diagram of an exemplary gaming machine 800 in accordance with a specific embodiment of the present invention. As illustrated in the embodiment of FIG. 8, gaming machine 800 includes at least one processor 810, at least one interface 806, and memory 816.

In one implementation, processor 810 and master gaming controller 812 are included in a logic device 813 enclosed in a logic device housing. The processor 810 may include any conventional processor or logic device configured to execute software allowing various configuration and reconfiguration tasks such as, for example: a) communicating with a remote source via communication interface 806, such as a server that stores authentication information or games; b) converting signals read by an interface to a format corresponding to that used by software or memory in the gaming machine; c) accessing memory to configure or reconfigure game parameters in the memory according to indicia read from the device; d) communicating with interfaces, various peripheral devices 822 and/or I/O devices 811; e) operating peripheral devices 822 such as, for example, card reader 825 and paper ticket reader 827; f) operating various I/O devices such as, for example, display 835, key pad 830 and a light panel 816; etc. For instance, the processor 810 may send messages including configuration and reconfiguration information to the display

835 to inform casino personnel of configuration progress. As another example, the logic device 813 may send commands to the light panel 837 to display a particular light pattern and to the speaker 839 to project a sound to visually and aurally convey configuration information or progress. Light panel 837 and speaker 839 may also be used to communicate with authorized personnel for authentication and security purposes.

Peripheral devices 822 may include several device interfaces such as, for example: card reader 825, bill validator/paper ticket reader 827, hopper 829, etc. Card reader 825 and bill validator/paper ticket reader 827 may each comprise resources for handling and processing configuration indicia such as a microcontroller that converts voltage levels for one or more scanning devices to signals provided to processor 810. In one embodiment, application software for interfacing with peripheral devices 822 may store instructions (such as, for example, how to read indicia from a portable device) in a memory device such as, for example, non-volatile memory, hard drive or a flash memory.

The gaming machine 800 also includes memory 816 which may include, for example, volatile memory (e.g., RAM 809), non-volatile memory 819 (e.g., disk memory, FLASH memory, EPROMs, etc.), unalterable memory (e.g., EPROMs 808), etc. The memory may be configured or designed to store, for example: 1) configuration software 814 such as all the parameters and settings for a game playable on the gaming machine; 2) associations 818 between configuration indicia read from a device with one or more parameters and settings; 3) communication protocols allowing the processor 810 to communicate with peripheral devices 822 and I/O devices 811; 4) a secondary memory storage device 815 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, etc.) for allowing the gaming machine to communicate with local and non-local devices using such protocols; etc. Typically, the master gaming controller 812 communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers 842 may be stored in memory 816. Example of different types of device drivers may include device drivers for gaming machine components, device drivers for peripheral components 822, etc. Typically, the device drivers 842 utilize a communication protocol of some type that enables communication with a particular physical device. The device driver abstracts the hardware implementation of a device. For example, a device drive may be written for each type of card reader that may be potentially connected to the gaming machine. Examples of communication protocols used to implement the device drivers 259 include Netplex 260, USB 265, Serial 270, Ethernet 275, Firewire 285, I/O debouncer 290, direct memory map, serial, PCI 280 or parallel. Netplex is a proprietary IGT standard while the others are open standards. According to a specific embodiment, when one type of a particular device is exchanged for another type of the particular device, a new device driver may be loaded from the memory 816 by the processor 810 to allow communication with the device. For instance, one type of card reader in gaming machine 800 may be replaced with a second type of card reader where device drivers for both card readers are stored in the memory 816.

In some embodiments, the gaming machine 800 may also include various authentication and/or validation components 844 which may be used for authenticating/validating specified gaming machine components such as, for example, hardware components, software components, firmware components, information stored in the gaming machine memory 816, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

In some embodiments, the software units stored in the memory 816 may be upgraded as needed. For instance, when the memory 816 is a hard drive, new games, game options, various new parameters, new settings for existing parameters, new settings for new parameters, device drivers, and new communication protocols may be uploaded to the memory from the master gaming controller 104 or from some other external device. As another example, when the memory 816 includes an optical storage device such as, for example, a CD/DVD disk drive designed or configured to store game options, parameters, and settings, the software stored in the memory may be upgraded by replacing a first optical storage device with a second optical storage device. In yet another example, when the memory 816 uses one or more flash memory 819 or EPROM 808 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

It will be apparent to those skilled in the art that other memory types, including various computer readable media, may be used for storing and executing program instructions pertaining to the operation of the present invention. Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files including higher level code that may be executed by the computer using an interpreter.

Additional details about other gaming machine architectures, features and/or components are described, for example, in U.S. patent application Ser. No. 10/040,239, entitled, "GAME DEVELOPMENT ARCHITECTURE THAT DECOUPLES THE GAME LOGIC FROM THE GRAPHICS LOGIC," and published on Apr. 24, 2003 as U.S. patent Publication No. 20030078103, incorporated herein by reference in its entirety for all purposes.

Gaming System

A notable aspect of the present invention relates to game software licensing and game license management. When a gaming platform is capable of providing multiple games to a game player based upon a game selection made by the player or an operator, it may be desirable from both an operator perspective and a content provider perspective to provide capabilities for allowing more complex game licensing methods. The operator and content provider may use the licensing capabilities to enter into licensing agreements that better reflect the value of the content (e.g., game software) to each party. For instance, the licensing parties may agree to utility model based licensing schemes, such as pay-per-use scheme. In a pay-per-use scheme, operators only pay for game software that is utilized by their patrons protecting them for software titles that are "duds."

Game platforms exist that provide access to multiple electronic games. On these devices, a game selection menu may be provided on a video display, which offers the patron the choice of at least two electronic games and a game player may select a game of their choice from the games available on the gaming machine. Typically, the choices of games available to the player are only those licensed for play on the gaming platform. The gaming platform may provide a manual mechanism, such as a display interface on the gaming machine, for updating and renewing licensing on the gaming machine.

In some game platforms offering multiple games, the games are stored on read-only memory device, such as EPROM chip sets or a CD-ROM. To provide new or a different game on a gaming platform of this type, a technician, usually accompanied by a gaming regulator, must manually install a new memory device (e.g. EPROM) and then manually update the licensing configuration on the gaming machine. The gaming regulator then places evidence tape across the EPROM. The evidence tape is used to detect tampering between visits by the gaming regulator. Since operations performed by entities other than a "trusted" 3$^{rd}$ party, such as a gaming regulator, have been deemed untrustworthy, automatic game downloads and automatic licensing management are typically not available on these platforms.

The licensing of multiple games on a gaming machine is described in U.S. Pat. No. 6,264,561 (Electronic Gaming Licensing Apparatus and Method, assigned to IGT (Reno, Nev.)), which is incorporated herein in its entirety and for all purposes. In U.S. Pat. No. 6,264,561, multiple games may be stored on an EPROM. Typically, the EPROM may store up to 10 games. The method for getting a license to turn on 3 of 10 games consists of having an operator log onto the gaming machine, select the games to activate and obtain a request code for the selected games that allows them to be activated. Typically, the games are licensed for a limited time period. One disadvantage to this technique lies in the finite capacity of the storage device (EPROM in this case). While 5 or even 10 games can be stored on an EPROM, IGT's library of thousands of games cannot fit. Switching to higher capacity devices such as DVDs may postpone the problem somewhat, but this device will be eventually saturated as well.

Other disadvantages are that the games are manually installed and activated. Thus, any changes or upgrades to the software on the gaming machine, such as adding a new game or fixing software on any of the games on the storage device typically involves replacing the entire storage device. As the number of games on the storage devices is increased and more games are made available on gaming platforms, it is likely that more frequent configuration changes on the gaming platform will be desired. As the number of configuration changes increases, it becomes more desirable to automate the configuration and licensing process.

One method to avoid swapping of the physical DVD, EPROM, etc., devices that store the game programs is to electronically download the necessary software into the gaming machine. Software download also allows a gaming machine to access scalable server farms and databases to select a set of games it needs from the game library. A desire of casino operators after games are safely downloaded is the ability to electronically move the games around on the casino floor. Casino managers routinely move slot machines (entire slot machine) around the floor in search of the optimum layout. A popular new game might be located near the door, but an older game might be better suited in the back. A Harley-Davidson™ game might be moved to the front during a Biker's convention, etc. Casinos often protect the arrangement of slot games as trade secrets. The laborious and costly casino floor rearrangement process needs to be expedited. When games can be electronically downloaded, they may also be electronically moved around the casino floor.

When a choice of games is offered, it complicates their distribution in part because every customer (purchaser of game software) may choose to license a unique combination of games. For example, one may choose Blackjack, Poker, and Keno while another chooses Poker, Twenty One, and Wheel of Fortune. One means to provide this would be to create a custom configuration of game software as requested by each customer. But, this "binary packaging" can be difficult and time consuming to manage especially in an envisioned environment where hundreds of new games may be introduced each year and distributed to thousands of slot machines on a typical casino floor. Another method of game licensing is to distribute all games to every customer and use an encryption technique that allows customers to 'unlock' only the games they are willing to buy, and install them only on the number of machines for which they have licenses. As described above, the activation is performed manually at the gaming machine. It is anticipated that it will be difficult to manage manually a game inventory mix in an environment where hundreds of new game titles may surface each year.

Manual activation schemes enforced with encryption present problems. Managers often change the selection and mix of games found in a given area of the casino because it can dramatically affect the amount of play and revenue. From the viewpoint of gaming operators, the overhead associated with manually activating encrypted games each time a game is added, deleted or transferred is a deterrent to providing gaming platform with multiple games. In addition, once the 'key' has been given to 'unlock' a particular game on one machine, it may be difficult to then revoke a key residing on a stand-alone machine. In a stand-alone machine, an operator must manually access the interior of the gaming machine and install software that revokes the key. Without the ability to 'lock' games once they have been 'unlocked,' multiple, unauthorized copies could operate simultaneously.

It is unacceptable to game content providers and gaming regulators to allow the use of unauthorized and untracked software on gaming platforms. To be properly compensated, game content providers want to know where and how much their software is being used. To ensure fairness, gaming regulators need to be able show that game software residing on a gaming machine is authentic and approved game software from an authorized content provider. In light of the above, methods that automate the game changeover process on gaming machine while providing an accurate record of the software transactions for auditing purposes and for use in utility licensing models are desirable.

In the past, a game license has been associated with the game software and the physical gaming machine that runs it. For example, the license may have been tied to a particular CPU or microprocessor on the gaming machine. In future gaming systems with gaming machines that are download enabled and include multiple cells or cores that are capable of running multiple "virtual machines," it is anticipated that the game software and its license may no longer be associated with the gaming machine on which it is executed. In this environment, the game software may be allowed to "float" between various gaming devices and the physical device where the game software is executed becomes less relevant. For example, a casino floor could have 3000 gaming machines/game servers with the capability of generating 10,000 games of chance simultaneously where each gaming machine has the ability to remotely generate a game outcome on the other gaming machines or download game software to the other gaming machines. For the purposes of licensing, each instantiation of a game of chance may be viewed as a "virtual" gaming machine where each "virtual" gaming machine may be licensed individually. Thus, a license management system and methods are needed to manage game licenses for the 10,000 virtual gaming machines in a manner that meets the requirements of game regulators, casino operators, gaming machine manufacturers and game software content providers.

To implement gaming downloads for operator configuration purposes as well as game-on-demand for game players, the concerns and issues of many gaming interests, such as game players, casino operators, gaming regulators and game software providers, must be considered. The concerns and issues may include but are not limited to licensing requirements, regulatory requirements, network reliability and download time. Details of apparatus and methods designed to address these concerns are described with respect to the following figures.

Figure 9:
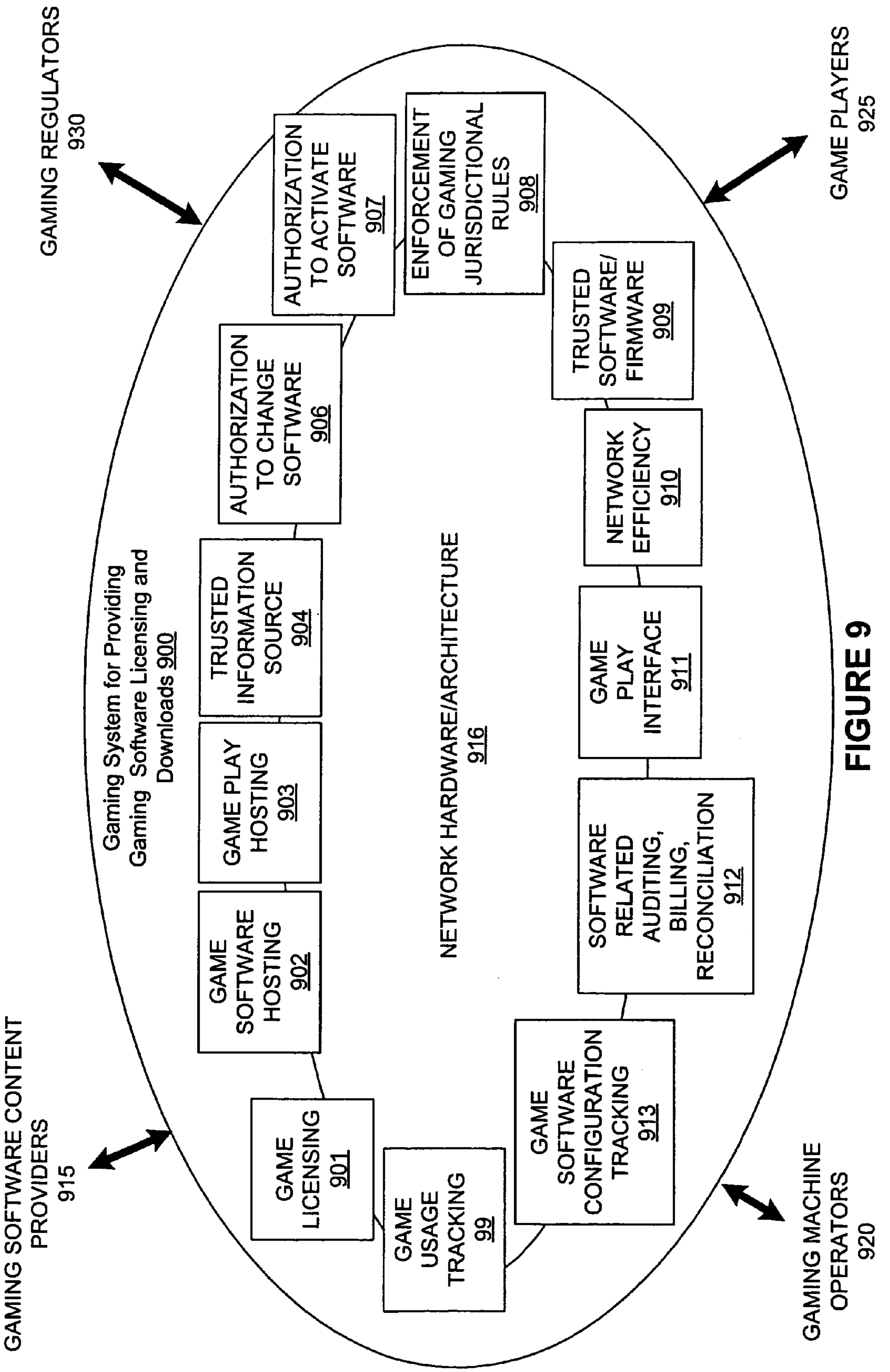
FIG. 9 is a block diagram of a gaming system of the present invention.

FIG. 9 shows a block diagram illustrating components of a gaming system 900 which may be used for implementing various aspects of the present invention. In FIG. 9, the components of a gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 9, only one instance of each function is shown. The functions of the components may be combined. For example, a single device may comprise the game play interface 911 and include trusted memory devices or sources 909.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 may provide rules and regulations that must be applied to the gaming system and may receive reports and other information confirming that rules are being obeyed.

In the following paragraphs, details of each component and some of the interactions between the components are described with respect to FIG. 9. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 915 may track the usage of game software on a plurality of devices in communication with the host. The game usage-tracking host 915 may be in communication with a plurality of game play hosts and gaming machines. From the game play hosts and gaming machines, the game usage tracking host 915 may receive updates of an amount that each game available for play on the devices has been played and on amount that has been wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC's and PDA's. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources. Trusted information sources 904 may be devices, such as servers, that provide information used to authenticate/activate other pieces of information. CRC values used to authenticate software, license tokens used to allow the use of software or product activation codes used to activate to software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities. Details of zero knowledge proofs that may be used with the present invention are described in U.S. publication No. 2003/0203756, by Jackson, filed on Apr. 25, 2002 and entitled, "Authentication in a Secure Computerized Gaming System, which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 900 of the present invention may include devices 906 that provide authorization to download software from a first device to a second device and devices 907 that provide activation codes or information that allow downloaded software to be activated. The devices, 906 and 907, may be remote servers and may also be trusted information sources. One example of a method of providing product activation codes that may be used with the present invention is describes in previously incorporated U.S. Pat. No. 6,264,561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in the present inventions, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 9. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of the present invention.

In specific embodiments where the gaming machine has been configured or designed to implement server based gaming (SBG) functionality (which, for example, may include downloading appropriate data, code, files, images, etc. from a remote game server), the gaming machine file system may be adapted to be writable and/or dynamically updatable. Accordingly, in at least one embodiment, any number of new files/directories may be added into mass storage at run-time by the downloading operations. However, a certain number of files, images and/or directories may need to be removed before the gaming machine system boots up. Such changes give rise to a number of issues such as, for example: (1) how to define a way to merge the downloaded files/images/directories into the current active system without breaking the authentication; (2) how to handle the different requirements for downloading and installation; (3) how to handle non-authenticated files/images such as those which may result from a power hit during file/image downloading operations and/or during file/image moving/copying operations.

According to various embodiments of the present invention, one technique for resolving the above-described issues is to divide the gaming machine file system into separate partitions or folders, wherein each partition or folder is adapted to serve a different function with regard to the downloading, authenticating, and installing of new or updated files/images. This is illustrated, for example, in FIG. 10 of the drawings. According to at least one implementation, the term "file/image" may be used to generally describe any type of file, image, data and/or other information which may be utilized by the gaming machine and/or its associated peripheral devices to perform one or more functions.

Figure 10:
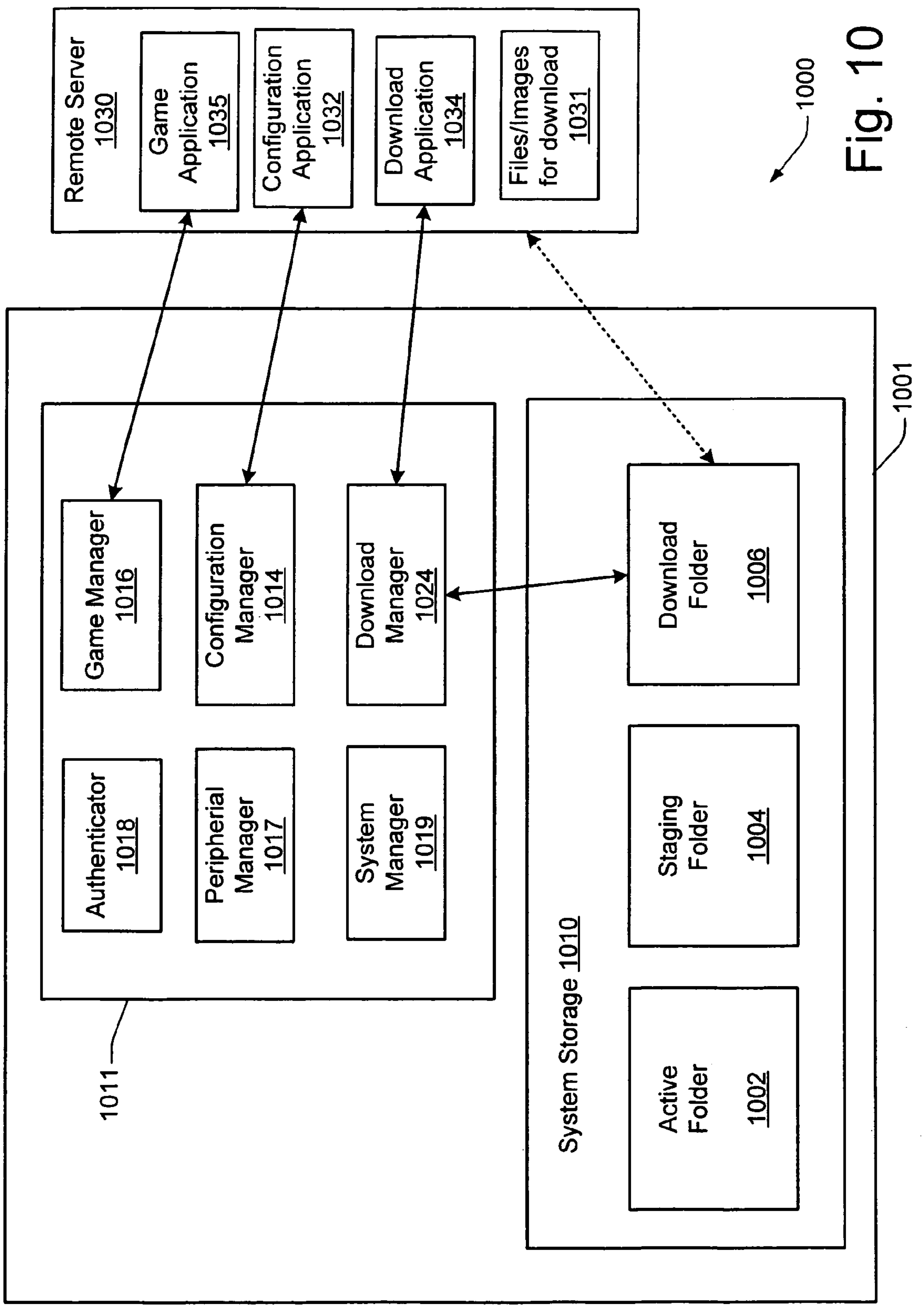
FIG. 10 shows a block diagram of a specific embodiment of gaming system 1000 which may be used for implementing various aspects of the present invention.

FIG. 10 shows a block diagram of a specific embodiment of gaming system 1000 which may be used for implementing various aspects of the present invention. In the embodiment of FIG. 10, gaming system 1000 is shown to include an example of a gaming machine portion 1001 which may be used for implementing various aspects of the present invention.

As illustrated in FIG. 10, gaming machine portion 1001 may include a system storage component 1010 such as for example, one or more disk drives and/or other types of non-volatile memory. In at least one implementation, the system storage 1010 may be virtualized across multiple drives. In one implementation, the system storage 1010 may corresponded to a storage device which has been partitioned into multiple partitions including, for example, an Active partition, a Staging partition, and a Download partition. Alternatively, the system storage 1010 may be organized into multiple folders or directories including, for example, an Active folder 1002, a Staging folder 1004, and a Download folder 1006. For purposes of simplification, it will be assumed that the system storage 1010 includes multiple folders as shown, for example, in FIG. 10.

According to a specific embodiment, the file system of the present invention may be implemented using a physical file structure residing in the gaming machine memory such as, for example, system storage 1010. In one implementation, an authenticated formatting utility (which, for example, may be stored on an optical disk and/or boot PROM) may be used to install desired file structures and directories at the system storage 1010. Additionally, in at least one embodiment, the installed file structures and directories at the system storage 1010 may also be authenticated prior to utilization. In one implementation, a failure in the authentication of the physical file structure may result in the generation of an error condition at the gaming machine.

As described in greater detail below, different mechanisms may be provided to create these folders, move/copy the files/images from one folder to another without breaking the authentication, and/or resume interrupted file manipulation operations (e.g., move/copy operations and/or download operations which have been interrupted by a power hit). In at least one implementation, the code or software utilized for performing such operations (and/or other operating system operations) is first authenticated prior to being utilized. According to a specific embodiment, utilization of code or software (e.g., at the gaming machine) which has not been properly authenticated may result in a breach of authentication, and may result in the generation of an error condition. In this way, the technique of the present invention is able to provide a self-diagnostic system for ensuring authenticated, atomic transactions, and for automatically handling detected error conditions.

According to a specific embodiment, each of the different folders 1002, 1004, 1006 of the system storage may be configured to serve a different function with regard to the downloading, authenticating, and installing of new or updated files/images. For example, the Active folder 1002 may be configured to store current active system software components, game software components, peripheral software components, etc. This folder may also include content currently stored on non-SBG hard drives. The Staging folder 1004 may be configured to store files/images to be installed into the Active folder and/or designated peripheral devices. The Download folder 1006 may include files/images downloaded from one or more remote servers such as, for example, remote server 1030.

As illustrated in FIG. 10, gaming system 1000 may include a Download Manager 1024, a Configuration Manager 1014, Authenticator 1018, Peripheral Manager 1017, System Manager 1019, and/or a Game Manager 1016. In at least one embodiment, the Download Manager, Configuration Manager, Authenticator, Peripheral Manager, System Manager 1019 and/or Game Manager may each be implemented using hardware and/or software components associated with Master Game Controller (MGC) 812 (FIG. 8).

In one implementation, the Download Manager 1024 may be configured or designed to manage file/image download operations from remote server 1030 to the Download folder 1006. As illustrated in FIG. 10, the Download Manager 1024 may work in conjunction with a download application 1034 which, for example, may be implemented at the remote server 1030. The download application 1034 may be configured to provide various information to the Download Manager such as, for example: information relating to the names or identities of files/images to be downloaded; information relating to download instructions (e.g., file sets to be downloaded, URLs of file locations, etc.); information relating to the packing of the file/images (e.g., encrypted, compressed, etc); information relating to the reason for the download for client logging purposes; etc. In one implementation the remote server 1030 may be configured or designed to store files, images and/or other data (e.g., 1031) to be downloaded to specified gaming machines. Alternatively, at least a portion of the files/images to be downloaded may be stored on a separate server such as, for example, an FTP server (not shown).

The Configuration Manager 1014 may be configured or designed to manage gaming machine system configuration operations. As illustrated in FIG. 10, the Configuration Manager 1014 may work in conjunction with a configuration application 1032 which, for example, may be implemented at the remote server 1030. The configuration application 1034 may be configured to provide various information to the Configuration Manager such as, for example: system configuration instructions/parameters, game configurations/parameters; associated peripherals configurations/parameters; available player denominations; money limits; betting configurations; etc. In one implementation the configuration application 1034 may be adapted to communicate with a plurality of different configuration managers from different gaming machines in order to implement desired system configurations on each gaming machine.

The Game Manager 1016 may be configured or designed to manage game-related parameters for the associated gaming machine. For example, the game manager may be used to manage the types of games to be downloaded and/or used to select the types of games to be mounted at the gaming machine. As illustrated in FIG. 10, the Game Manager 1016 may work in conjunction with a game application 1035 which, for example, may be implemented at the remote server 1030. The game application 1035 may be configured to provide various information to the Game Manager such as, for example: system game instructions/parameters; player help information, game name information; game description information; game icons; game paytable payback information; progressive link information; game denomination information; etc. In one implementation the game application 1035 may be adapted to communicate with a plurality of different game managers from different gaming machines in order to implement desired system games on each gaming machine.

The Authenticator 1018 may be configured or designed to authenticate files, images, or other data residing on the system storage 1010, including, for example, files/images/data residing in the Active folder, Staging folder, and/or Download folder. According to specific embodiments, the Authenticator 1018 may be configured or designed to handle authentication and boot up operations for SBG enabled machines and non-SBG enabled machines. In at least one implementation, the Authenticator may be adapted to boot the system from the Active folder.

For example, in one implementation, the Authenticator may be configured or designed to perform one or more of the following tasks during booting time: (1) authenticating system storage device(s) (e.g., local disk drives); (2) locating the system launcher and start the system; (3) handling downloaded files/images; etc. In one implementation, the handling downloaded file/images may include a variety of tasks such as, for example: authenticating selected folders or partitions (e.g., Download folder 1006, Staging folder 1004, Active folder 1002, etc.); integrating selected files/images from the Staging folder into the currently active directory; removing selected files/images from specified folders (such as, for example, Download folder, Staging folder and/or Active folder); modifying the cached file list; etc. Additionally, the Authenticator may be configured or designed to perform one or more of the following tasks during runtime, for example, to ensure that a newly downloaded game may be executed without rebooting the machine: (1) authenticating one or more directories which contain the newly downloaded game(s); (2) integrating the new game into the active folder where the current system and game reside; (3) unmouting a current game (e.g., upon Game Manager's request); (4) mounting the new game (e.g., upon Game Manager's request); modifying the cached file list; etc. In at least one implementation, the mounting of a game or other software component of the gaming machine may include expanding all directories contained within the game/software component package file/image, comparing the directories and their contents with trusted gaming information (such as, for example: a list of files expected to be in each directory, expected hash values for the files/images, etc.), and loading the expanded directories and contents thereof into the gaming machine memory (e.g., in the appropriate locations within the gaming machine file structure).

Figure 11:
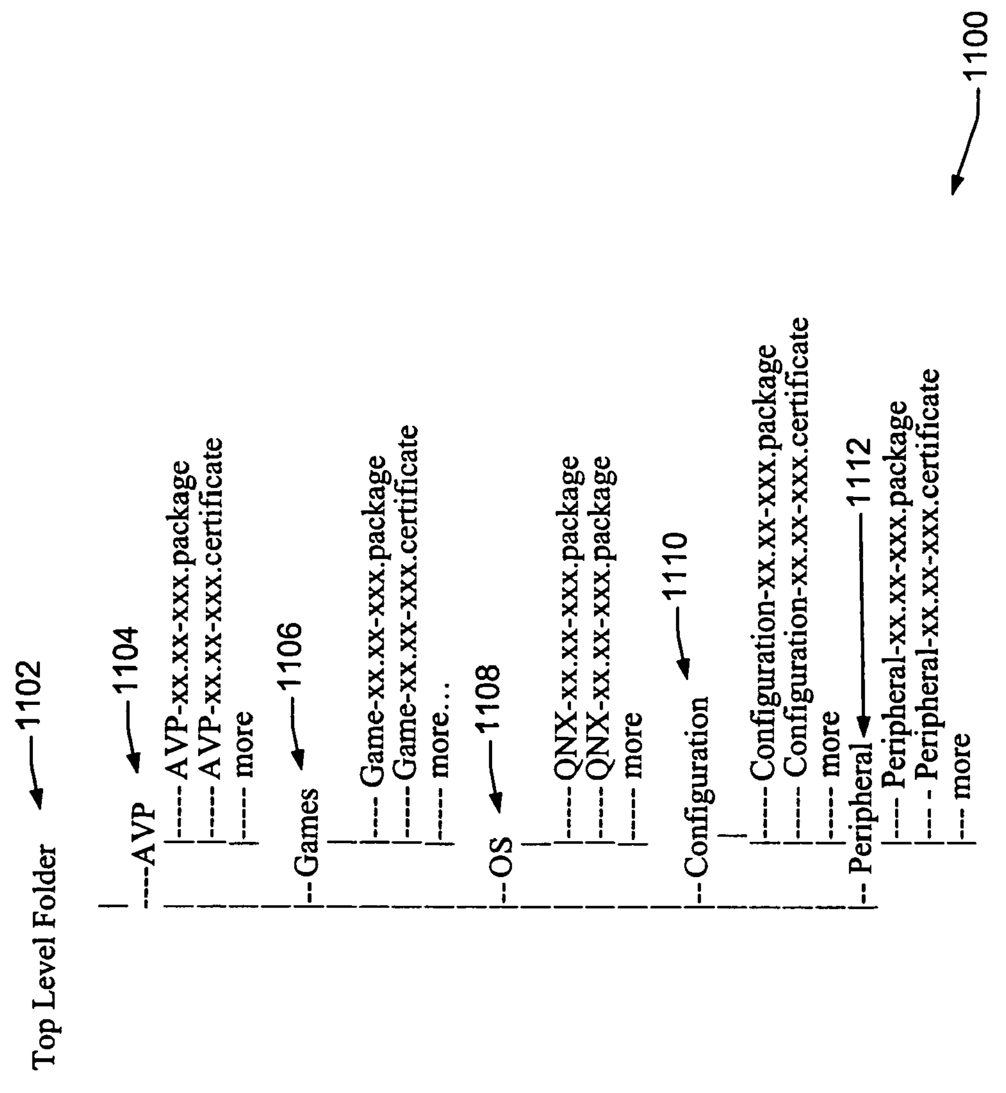
FIG. 11 shows an example of a directory structure 1100 in accordance with a specific embodiment of the present invention.

FIG. 11 shows an example of a directory structure 1100 in accordance with a specific embodiment of the present invention. According to different embodiments, desired portions of the exemplary directory structure of FIG. 11 may be implemented in selected partitions or folders of the system storage such as, for example, Download folder 1006, Staging folder 1004, Active folder 1002, etc. Thus, for example, if the directory structure 1100 were implemented in the Staging folder 1004, the Staging folder ("/Staging") may correspond to the top level folder 1102, and may include a plurality of sub-folders or sub-directories such as, for example, AVP (Advanced Video Platform) directory 1104, Games directory 1106, OS directory 1108, Configuration directory 1110, Peripheral directory 1112, or any combination thereof. Similarly, if the directory structure 1100 were implemented in the Active folder 1002, the Active folder ("/Active") may correspond to the top level folder 1102, and may include a plurality of sub-folders or sub-directories such as, for example, AVP directory 1104, Games directory 1106, OS directory 1108, Configuration directory 1110, Peripheral directory 1112, or any combination thereof. According to a specific implementation, the AVP directory 1104, OS directory 1108, and Configuration directory 1110 may be used for storing system related files/images/data; the Games directory 1106 may be used for storing game related files/images/data; and the Peripheral directory 1112 may be used for storing peripheral related files/images/data. As described in greater detail below, the Authenticator 1018 may be configured or designed to automatically integrate AVP, OS and/or Configuration system files/images (stored in the Staging folder) into the Active folder during boot up. In one implementation, the Authenticator may also be configured or designed to move broken image pair(s) under /Games and/or /Peripheral from Staging to Active folder, for example, to take care of power hit issues (and/or other issues) in order to satisfy authentication requirements. The Authenticator may also be configured or designed to integrate Game and/or Peripheral files/images at runtime (per request).

According to different embodiments of the present invention, different folders of the directory structure may have different associated authentication requirements. For example, in one implementation, some folders of the file system (e.g., Download Folder 1006) may be configured to allow non-authenticated files/images to be stored therein (such as, for example, new files/images which have been downloaded from a remote server but had not yet been authenticated). Other folders of the file system (e.g., Active Folder 1002 and/or Staging Folder 1004) may be configured to only allow storage of files/images which have already been authenticated. Additionally, in at least one implementation, different folders of the directory structure may require differing levels of authentication. For example, some folders in the file system may require a first type of authentication scheme in which files/images are authenticated using information from one or more trust of memory sources. Other folders in the file system may require another type of authentication scheme in which files/images are authenticated using information from associated "certificate" files.

For example, as illustrated in the example of FIG. 11, at least some of the files/images may be associated in pairs or other multiple file/image associations. For example, a paired set of files/images may include an associated "package" file (e.g., AVP-xx.xx-xxxx.package) and an associated "certificate" file (e.g., AVP-xx.xx-xxxx.certificate). In one implementation, the "package" file/image may be used for storing data such as, for example, software code to be executed by the gaming machine; and the "certificate" file may be used for storing security information such as, for example, key information or signature information which may be used for a validating and/or authenticating an associated "package" file. According to specific embodiments, it is also possible for at least some directories or subdirectories to not include any files/images.

Upon request, the Download Manager 1024 may handle operations relating to the downloading of files/images from a remote server to the Download folder. Such requests may be initiated from a variety of sources such as, for example: a remote device or server (e.g., download application 1034); a human administrator; a local component of the gaming machine; a player action (e.g., selecting a game from a menu); a gaming machine timer expiration (e.g., after a 24 hours time period); etc. In one implementation, the Download Manager may be enabled with the privilege to delete/remove files/images from Download folder. However, if desired, such privileges may not be extended to other folders such as, for example, the Staging and/or Active folders.

In at least one implementation, when the Download Manager receives an installation request, it may respond by copying or moving the required files/images (which may include certificate files) from the Download folder into the Staging folder. Additionally, the Download Manager may also notify the Game Manager 1016 and/or Peripheral Manager 1017 of the installation. In response, the Game Manager may notify the Authenticator in order to cause the Authenticator to integrate the moved/copied files/images from the Staging folder to the Active folder, for example, if the installation relates to a game update. In such cases, the Authenticator may respond by authenticating the required files/images in the Staging folder, and if successful, may then move or copy the files/images to the Active folder. Similar to the game image/file installation, a Peripheral Manager process may also send request messages to the Authenticator to cause the Authenticator to move peripheral-related files/images from the Staging folder to Active folder.

Alternatively, if the installation relates to a system update, the Download Manager may send a system reboot request to the System Manager 1019 to thereby cause the system to reboot. Installation of the new/updated system files/images may be handled by the Authenticator 1018 during the boot process. In at least one embodiment, when moving or copying designated files/images from one folder to another, the pair image/file and its associated "certificate" file may be copied/moved together. Additionally, when integrating a system update, the Authenticator may delete the current system package/certificate files/images under Active folder before installing the new system files/images. The Authenticator may also be configured or designed to remove from the Staging and/or Download folders files/images which are suspected or known to be invalid or non-authentic (such as, for example, files/images which are not able to be properly authenticated).

One of the advantages of the present invention is that it provides a mechanism for allowing non-authenticated files/images to exist concurrently in the gaming machine memory with authenticated files/images, without necessarily invoking an error condition. Additionally, the file system structure of the present invention may also be used to enable a gaming controller to automatically and dynamically differentiate between authenticated files/images and non-authenticated files/images stored in the gaming machine memory. Further, use of the file system technique of the present invention provides greater flexibility with regard to memory space allocation, and eliminates the requirement for storing authenticated and non-authenticated files/images in specifically allocated blocks of the gaming machine memory. Moreover, each folder or directory in the file system of the present invention may be assigned one or more attributes for defining how the files/images stored therein are to be handled by the gaming machine. For example, in one implementation, the gaming machine may be configured or designed to only execute or mount files/images which are stored under the Active folder or directory. In this implementation, the gaming machine may be prevented from executing or mounting files/images stored under the Staging folder/directory or Download folder/directory. For example, prior to executing or using a file/image, the gaming machine may compare attributes of the file/image (e.g., file location, file name, hash code, etc.) with approved criteria (e.g., a list of approved file locations, file names, file hash codes, etc.). If it is determined that the file/image attribute(s) do not confirm with the approved criteria, the file/image may not be used. According to a specific embodiment, the approved criteria may be authenticated prior to being used for comparison.

Figure 12:
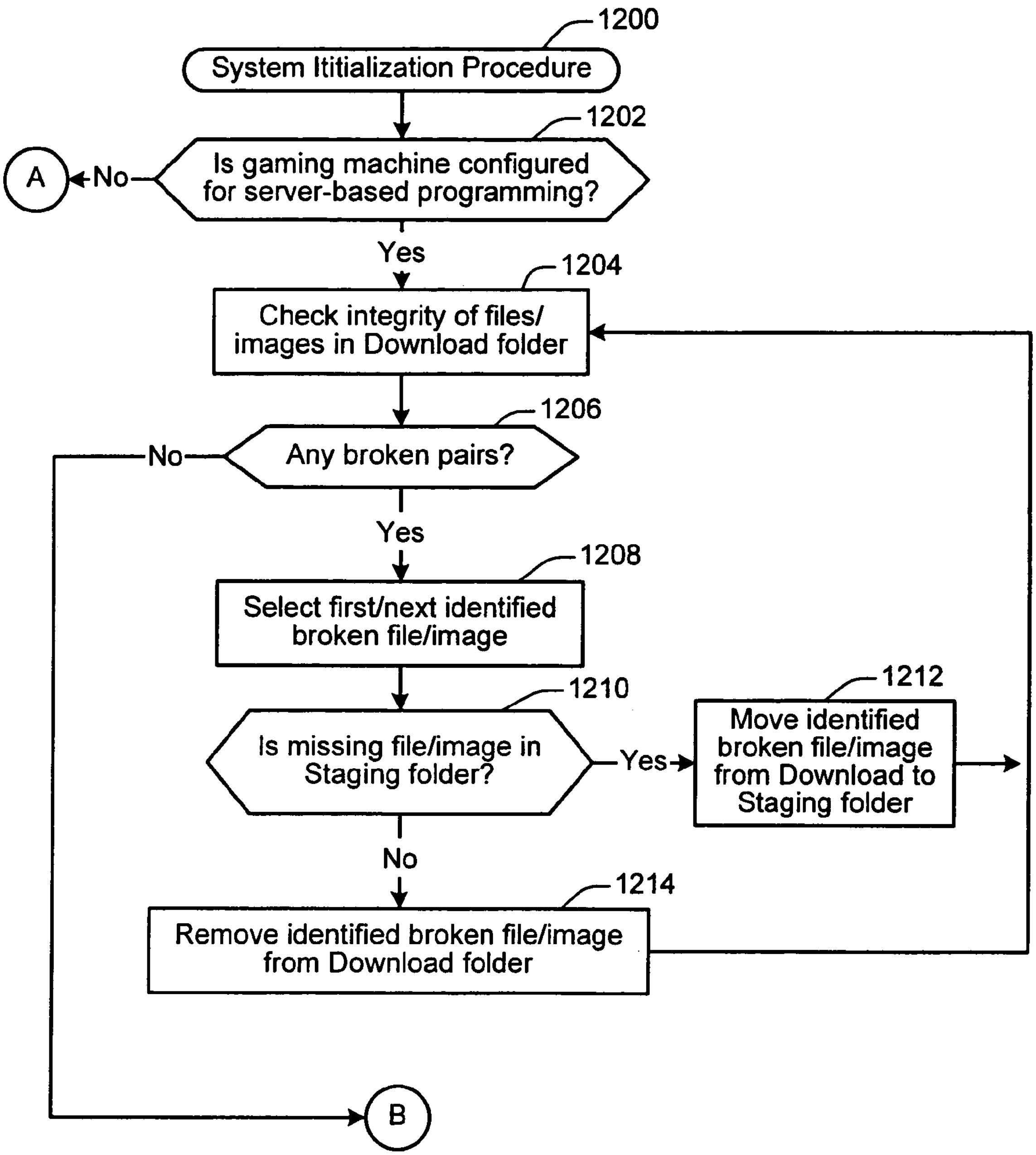
FIGS. 12-14 illustrate various flows relating to a System Initialization Procedure 1200 in accordance with a specific embodiment of the present invention.
Figure 13:
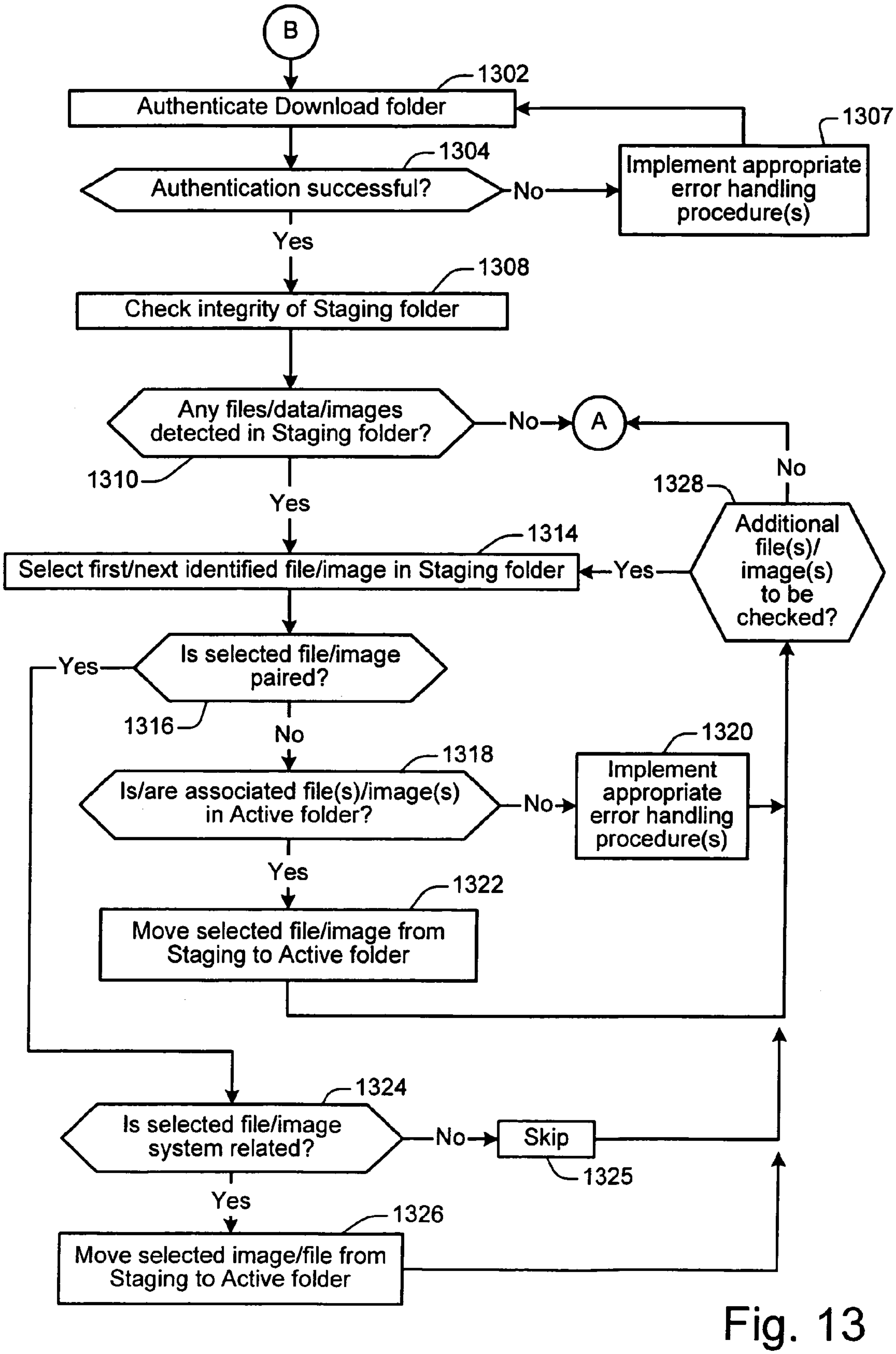
Figure 14:
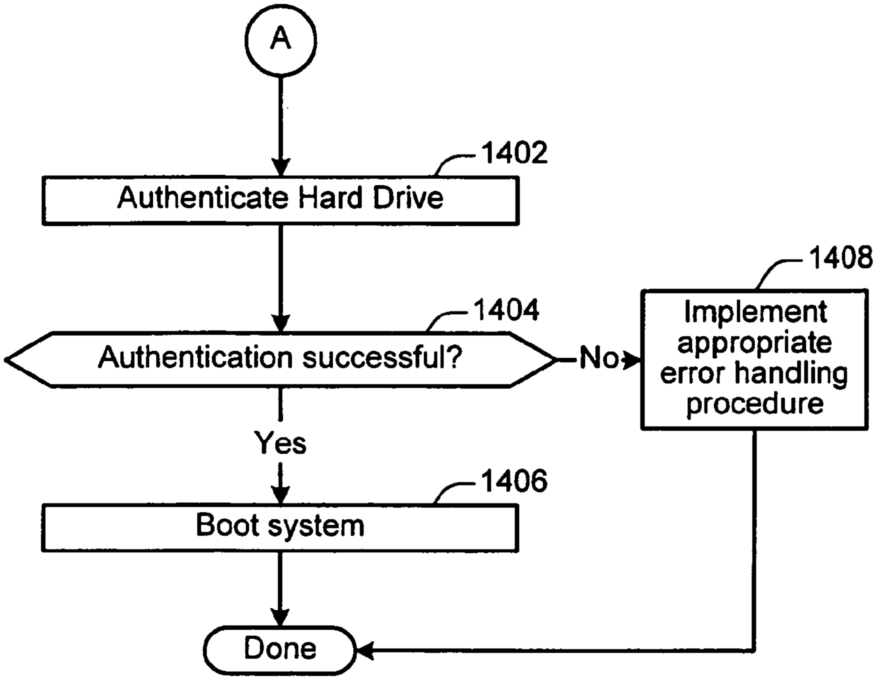

FIGS. 12-14 illustrate various flows relating to a System Initialization Procedure 1200 in accordance with a specific embodiment of the present invention. In at least one embodiment, some or all of the operations described in the System Initialization Procedure 1200 may be implemented by hardware/software components associated with the Master Game Controller (MCG) 812 (FIG. 8). According to specific embodiments, one aspect of the System Initialization Procedure is directed to a modified gaming machine booting process. In one implementation, the modified booting process may be adapted to detect and/or mount one or more mass storage units or memory units (e.g., disk drives), and perform a variety of tasks before booting the memory units such as those described, for example, in FIGS. 12-14 of the drawings.

As illustrated in FIG. 12, one of the tasks which may be performed by the System Initialization Procedure 1200 is to determine (1202) whether the gaming machine is configured or adapted for server-based programming. For example, SBG-enabled machines may be adapted for allowing server-based programming.

In general, a particular file folder structure is implemented on a gaming machine. Presence of specific components under the file folder structure may be used to indicate capabilities of the gaming machine. In one implementation, aspects of the file structure implemented on the mass storage unit(s) of the gaming machine may be used to determine whether the gaming machine is configured or adapted for server-based programming. Thus, for example, in one implementation, the Authenticator may check to see if the Download and/or Staging folder(s) (and/or their respective sub-folders) exist on the system storage 1010. If these folders exist, then it may be determined that the machine is SBG enabled. Alternatively, information relating to the gaming machine capabilities (e.g., whether the gaming machine is configured or adapted for server-based gaming) may be stored in one or more configuration files in the gaming machine memory.

If it is determined that the gaming machine is not adapted for server-based programming (e.g., not SBG-enabled), flow of the System Initialization Procedure may continue at reference point A (FIG. 14), whereupon the system may be booted (1406) from the hard drive(s) after the hard drives have been successfully authenticated (1402, 1404).

If, however, it is determined that the gaming machine is configured for server-based gaming (e.g., SBG-enabled), the integrity of any files/images in the Download folder 1006 may then be checked (1204). During the Download folder integrity check, a search may be performed in order to determine (1206) whether there are any broken pairs of files/images in the Download folder. For example, as described previously, a file pair may include a "package" file and a corresponding "certificate" file. If one of these files is detected without detecting the presence of its other associated file, such a condition may indicate the presence of a broken file pair.

If no broken file pairs are detected in the Download folder, flow of the System Initialization Procedure may continue at reference point B (FIG. 13). However, if one or more broken file pairs are detected in the Download folder, a first identified broken file/image may be selected (1208) for further processing. A search of the Staging folder may then be performed in order to determine (1210) whether the missing file/image (associated with the first identified broken file/image) exists in the Staging folder. Such a condition may arise, for example, if a system power hit had occurred while moving or copying the file/image pairs from the Download folder to the Staging folder. If the missing file/image is detected in the Staging folder, the identified broken file/image in the Download folder may then be moved or copied to the Staging folder. If, however, the missing file/image is not detected in the Staging folder, appropriate action may be taken for handling the identified broken file/image in the Download folder. For example, as illustrated in FIG. 12, one response may be to remove (1214) the identified broken file/image from the Download folder. Alternatively, if it is determined that the existence of the identified broken file/image in the Download folder was caused by an incomplete or failed download transaction (e.g., caused by a power hit while downloading from a remote server), an attempt may be made to complete or resume the remainder of the download transaction, and then verify the success of the download transaction and the integrity of the downloaded files.

According to a specific embodiment, the copying of a file or image from one folder to another may include performing a byte-by-byte copy of data to a new location, followed by a deletion of the original data. In contrast, the moving of a file or image from one folder to another may not necessarily result in any copying or replication of data. Rather, the moving of a file or image from one folder to another may include, for example: changing appropriate file table information and/or pointer information relating to the specified file/image; changing the file name or other file descriptor information and/or any combination thereof In at least one implementation, a move operation may be preferred over a copy operation since the move operation may be completed in a shorter time period, which helps to reduce vulnerability of the system to undesirable events such as, for example, system crashes, power hits, etc.

According to a specific embodiment, after a selected, identified broken file/image (in the Download folder) has been successfully processed as described above, the integrity of the remaining files/images in the Download folder may again be checked (1204), for example, in order to determine (1206) whether there are any other broken pairs of files/images in the Download folder. If so, a next identified broken file/image may be selected (1208) for further processing. Upon determining that no broken file pairs exist in the Download folder, flow of the System Initialization Procedure may continue at reference point B (FIG. 13).

According to a specific embodiment, it may be assumed at reference point B of the System Initialization Procedure (FIG. 13) that the Download Manager 1024 has successfully downloaded new or updated files/images from a remote server into the Download folder 1006. However, as illustrated in FIG. 13, the System Initialization Procedure may perform a variety of tasks before installing the files/images which have been downloaded into the Download folder 1006.

For example, as shown at 1302, the Download folder 1006 may be authenticated. According to a specific embodiment, authentication of the Download folder may include authenticating the directory structure of the Download folder and/or authenticating all files/images which exist within the Download folder or any of its associated sub-folders. If it is determined (1304) that the Download folder authentication is unsuccessful, appropriate error handling procedure(s) may be implemented (1307). According to different embodiments, some examples of appropriate error handling procedures may include: removing any non-authenticated files/images/data from the Download folder; shutting down or suspending selected gaming machine processes; recording states of selected gaming machine processes; reporting the unsuccessful authentication to an external device or entity; and/or any combination thereof. For example, in a specific embodiment where it is determined that the Download folder authentication is unsuccessful, any non-authenticated files/images/data may be removed or deleted from the Download folder, after which another authentication check may again be performed on the Download folder.

Once the Download folder has been successfully authenticated, an integrity check may then be performed (1308) on the Staging folder 1004. During the Staging folder integrity check, the Staging folder (and its associated sub-folders) may be examined in order to determine (1310) whether any files, images, and/or other data are stored therein. If no files/images/data are detected in the Staging folder (and sub-folders), then flow of the System Initialization Procedure may continue at reference point A (FIG. 14), whereupon the system may be booted (1406) from the hard drive(s) after the hard drives have been successfully authenticated (1402, 1404). According to a specific embodiment, any files/images remaining in the Download folder may be subsequently processed by the Download Manager after the system has booted up.

However, according to a specific embodiment, if any files or images are detected in the Staging folder, a first file/image may be identified and selected (1314) for further processing. Once a particular file/image in the Staging folder has been identified and selected, a determination may then be made (1316) as to whether any other requisite files/images associated with the currently selected file/image (such as, for example, paired package/certificate files/images) are also present in the Staging folder.

According to a specific embodiment, if the currently selected file/image is identified as a broken file/image (e.g., associated with a broken file/image pair), a search of the Active folder may be performed in order to determine (1318) whether the missing associated file(s)/image(s) exist in the Active folder. If the missing associated file(s)/image(s) are detected in the Active folder, the currently selected broken file/image (in the Staging folder) may then be moved or copied to the Active folder. If, however, the missing associated file(s)/image(s) are not detected in the Active folder, appropriate action may be taken (1320) for handling the selected identified broken file/image in the Staging folder. Examples of appropriate error handling procedures may include: removing or purging the identified broken file/image from the Staging folder; shutting down or suspending selected gaming machine processes; recording or preserving states of selected gaming machine processes; storing a copy of the identified broken file/image for subsequent analysis; reporting the error to an external device or entity; and/or any combination thereof.

In at least one implementation, if it is determined that the selected file/image (of the Staging folder) is properly paired with its associated file(s)/image(s), the related association type (e.g., system-related, game-related, peripheral-related, etc.) of the selected file/image may then be determined in order to properly process the selected file/image. For example, as illustrated in the embodiment of FIG. 13, a determination may be made (1324) as to whether the selected file/image corresponds to a system-related type file or image. In a specific implementation, a selected file/image may be identified as being system-related if the file/image is stored under a system-related directory or sub-directory such as, for example, /AVP (e.g., 1104), /OS (e.g., 1108), and/or /Configuration (e.g., 1110). If it is determined that the selected file/image corresponds to a system-related type file or image, the selected file/image may be moved (1326) or copied from the Staging folder to the Active folder. In at least one implementation, one or more files/images may be purged from the Active folder (such as, for example, system file/image pairs which are to be replaced by the selected file/image pair) before moving or copying the system-related files/images from the Staging folder to the Active folder.

However, according to a specific embodiment, non-system-related files/images in the Staging folder (such as, for example, game-related files/images, peripheral-related files/images, etc.) may be skipped (1325) or allowed to remain in the Staging folder for subsequent handling. For example, in one implementation, game-related files/images in the Staging folder may be allowed to remain in the Staging folder until such files/images may be handled during the Game Initialization Procedure (e.g., 1600) which may take place after the System Initialization Procedure has been completed. Similarly, peripheral-related files/images in the Staging folder may be allowed to remain in the Staging folder until such files/images may be handled during the Peripheral Initialization Procedure (e.g., 1500) which may take place after the System Initialization Procedure has been completed.

As shown at 1328, a determination may be made as to whether there are additional file(s)/image(s) in the Staging folder which have not yet been processed. If so, a next file/image in the Staging folder (or associated sub-folders) may be identified and selected (1314) for further processing. After all appropriate files/images in the staging folder have been processed, flow of the System Initialization Procedure may continue at reference point A (FIG. 14).

Commencing from reference point A of FIG. 14, the system storage device(s) 1010 (which, for example, may include one or more hard drives) are authenticated (1402). In one implementation, the Authenticator 1018 may be configured or designed to perform at least a portion of the system storage authentication operations. In the event that it is determined (1404) that the system storage authentication was unsuccessful, one or more appropriate error handling procedure(s) may be implemented (1408). Examples of appropriate error handling procedures may include: removing or purging non-authenticated file(s)/image(s) from the hard drive; shutting down or suspending selected gaming machine processes; recording or preserving states of selected gaming machine processes; storing copies of selected files/images identified on the hard drive for subsequent analysis; reporting the error to an external device or entity; etc.

Assuming that the system storage authentication is successful, the gaming machine system may be booted (1406) using, for example, system-related files/images stored under the Active folder 1002 (and/or its associated sub-folders) of the system storage 1010.

In at least one implementation, one or more of the file/image downloading processes, file/image move/copy processes, and/or authentication processes may be implemented as asynchronous processes. In one embodiment, one or more semaphore certificate file(s) may be used to manage and coordinate file/image manipulations (e.g., moving, copying, mounting, installing, etc.) which may be performed by the various processes. For example, in one implementation, a special semaphore certificate file may be placed in the Staging folder by the Download Manager before the Download Manager starts to move/copy specific files/images from the Download folder to the Staging folder. The presence of the semaphore certificate file in the Staging folder may indicate to the Authenticator that the moving/coping action being performed on the specific files/images has not yet been completed. As a result, the Authenticator may delay its actions until the semaphore certificate file associated with the specific files/images has been removed from the Staging folder. For example, in one embodiment where the specific files/images correspond to system-related files/images which are being moved from the Download folder to the Staging folder, the presence of a semaphore certificate file (associated with the system-related files) in the Staging folder may indicate to the Authenticator that the system-related files in the staging folder are to be treated as being a part of a yet incomplete installation package. Accordingly, the Authenticator may respond by delaying the moving of such files/images to Active folder, for example, in order to avoid an incomplete or improper system update. Thus, for example, in one implementation, the Authenticator may boot the system using the non-updated system files/images currently residing in the Active folder.

In addition to performing integrity checks and authentication checks of the files/images stored on the system storage 1010, the technique of the present invention may also be used to perform compatibility checks of various files/images, for example, to help ensure proper compatibility between the various gaming machine components, peripherals, and games. For example, in one implementation at least a portion of the system-related files/images stored in the system storage 1010 may include compatibility information which, for example, may be used for determining compatibility criteria for subsequent game downloads and installation. Thus, for example, before mounting new game software which has been downloaded to the gaming machine, a compatibility check may be performed to ensure that the downloaded game software is compatible with the current version of the gaming machine operating system. Similarly, before installing new system-related files/images which have been downloaded to the gaming machine, a compatibility check may be performed to ensure that the downloaded files/images are compatible with the current version(s) of the game software currently mounted on the gaming machine. In at least one implementation, the Download folder and/or Staging folder may be used to store down loaded files/images or other data which can not be implemented at runtime (due to compatibility reasons, for example).

According to a specific embodiment, once the gaming machine system has been successfully initialized and booted, other types of procedures, components and/or processes may then be initiated such as, for example, the Peripheral Initialization Procedure 1500 (FIG. 15), Game Initialization Procedure 1600 (FIG. 16), etc.

Figure 15:
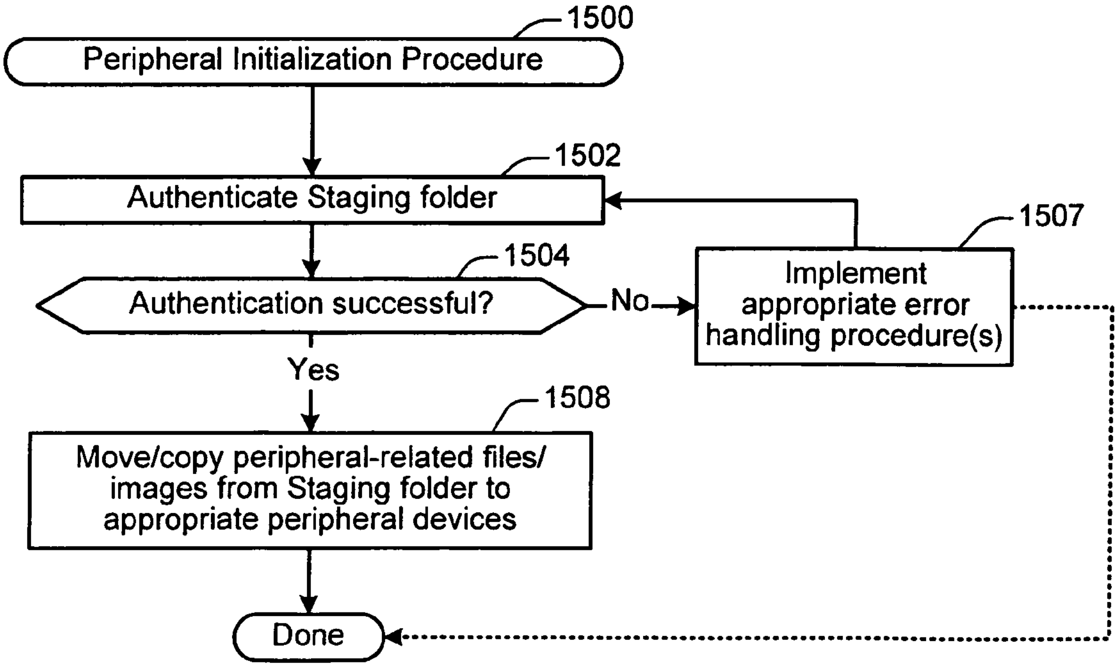
FIG. 15 shows a flow diagram of a Peripheral Initialization Procedure 1500 in accordance with a specific embodiment of the present invention.

FIG. 15 shows a flow diagram of a Peripheral Initialization Procedure 1500 in accordance with a specific embodiment of the present invention. In at least one implementation, the Peripheral Initialization Procedure 1500 may be initiated at the request of the Peripheral Manager 1017. In the embodiment shown in FIG. 15, it may be assumed that the Download Manager has coordinated the download of one or more peripheral-related files/images from a remote server to the system storage 1010. In one implementation the downloaded peripheral-related files/images may initially be downloaded to the Download folder 1006. Thereafter they may be authenticated and then moved to the Staging folder 1004 as described previously, for example, with respect to FIGS. 12-14. Upon request from the Peripheral Manager, the Staging folder may be authenticated (1502) in order to authenticate the downloaded peripheral-related files/images located under the Staging folder (and/or associated sub-folders).

If it is determined (1504) that the Staging folder authentication is unsuccessful, appropriate error handling procedure(s) may be implemented (1507). According to different embodiments, examples of appropriate error handling procedures may include: removing any non-authenticated files/images/data from the Staging folder; shutting down or suspending selected gaming machine processes; recording states of selected gaming machine processes; storing copies of selected files/images identified on the hard drive for subsequent analysis; reporting the unsuccessful authentication to an external device or entity; and/or any combination thereof. For example, in a specific embodiment where it is determined that the Staging folder authentication is unsuccessful, any non-authenticated files/images/data may be removed or deleted from the Staging folder, after which another authentication check may again be performed on the Staging folder. Alternatively, in a different embodiment, the Peripheral Initialization Procedure may be terminated, and an external entity (e.g., human administrator and/or remote device) may be notified of the Staging folder authentication failure.

Assuming, however, that the Staging folder authentication is successful, the peripheral-related files/images may be moved or copied (1508) from in the Staging folder to one or more appropriate peripheral devices of the gaming machine. Alternatively, in a different embodiment where the gaming machine is configured or designed to execute or mount only files/images which are stored under the Active folder or directory, the authenticated peripheral-related files/images may be moved or copied from the Staging folder to the Active folder (e.g., to a Peripheral subfolder located under the Active folder). Thereafter, one or more appropriate peripheral devices may access the authenticated peripheral-related files/images stored under the Active folder.

Figure 16:
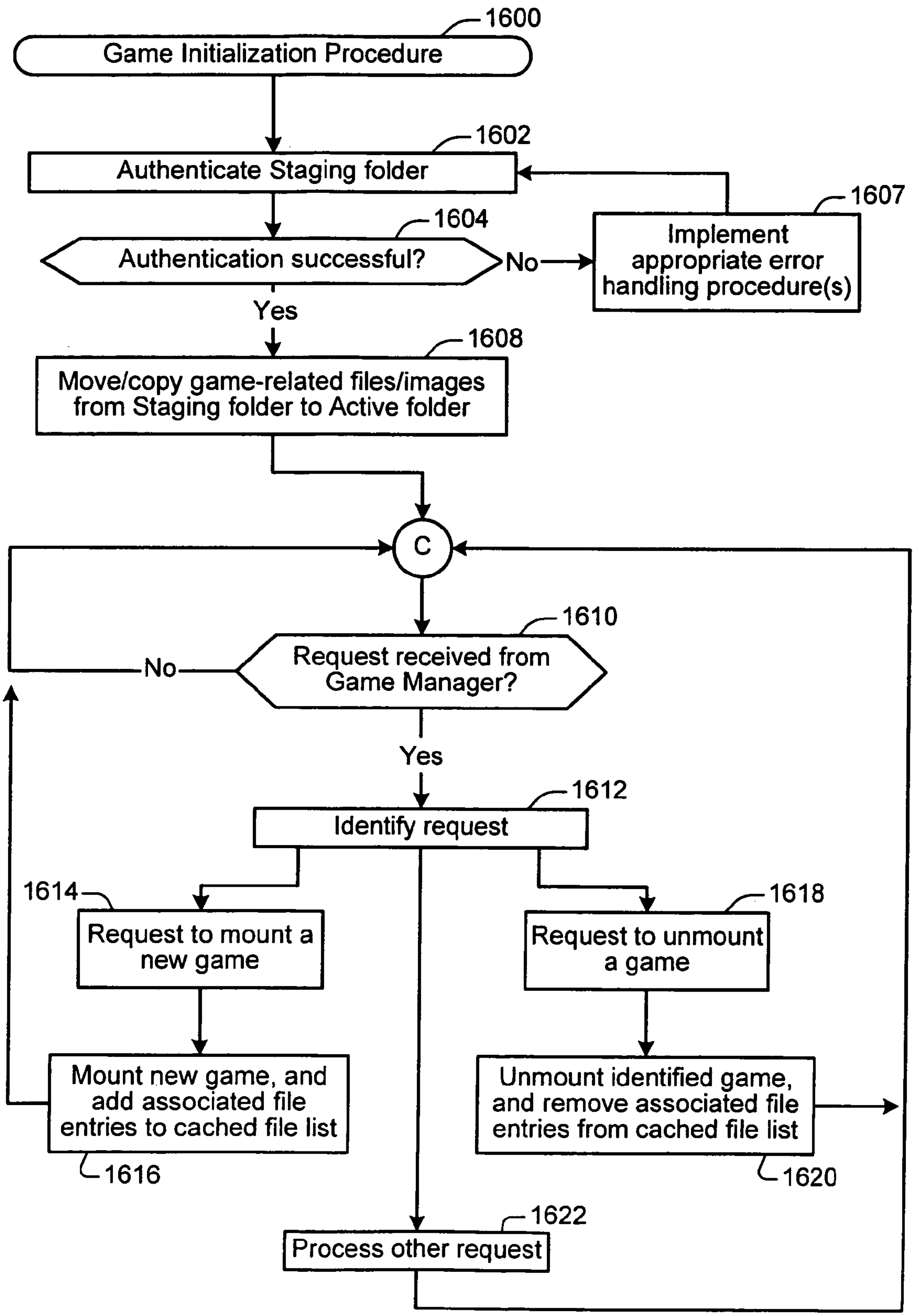
FIG. 16 shows a flow diagram of a Game Initialization Procedure 1600 in accordance with a specific embodiment of the present invention.

FIG. 16 shows a flow diagram of a Game Initialization Procedure 1600 in accordance with a specific embodiment of the present invention. In at least one implementation, the Game Initialization Procedure 1600 may be initiated at the request of the Game Manager 1016. In the embodiment shown in FIG. 16, it may be assumed that the Download Manager has coordinated the download of one or more game-related files/images from a remote server to the system storage 1010. In one implementation the downloaded game-related files/images may initially be downloaded to the Download folder 1006. Thereafter they may be authenticated and then moved to the Staging folder 1004 as described previously, for example, with respect to FIGS. 12-14. Upon request from the Game Manager, the Staging folder may be authenticated (1602) in order to authenticate the downloaded game-related files/images located under the Staging folder (and/or associated sub-folders). Alternatively, in a different implementation, game-related files/images may be downloaded to the Download folder, authenticated, and then moved directly to the Active folder for subsequent mounting.

Returning to the example of FIG. 16, if it is determined (1604) that the Staging folder authentication is unsuccessful, appropriate error handling procedure(s) may be implemented (1607). According to different embodiments, examples of appropriate error handling procedures may include: removing any non-authenticated files/images/data from the Staging folder; shutting down or suspending selected gaming machine processes; recording states of selected gaming machine processes; storing copies of selected files/images identified on the hard drive for subsequent analysis; reporting the unsuccessful authentication to an external device or entity; and/or any combination thereof. For example, in a specific embodiment where it is determined that the Staging folder authentication is unsuccessful, any non-authenticated files/images/data may be removed or deleted from the Staging folder, after which another authentication check may again be performed on the Staging folder. Alternatively, in a different embodiment, the Game Initialization Procedure may be terminated, and an external entity (e.g., human administrator and/or remote device) may be notified of the Staging folder authentication failure.

Assuming, however, that the Staging folder authentication is successful, the Game-related files/images may be moved or copied (1608) from in the Staging folder to the Active folder 1010 of the system storage. Thereafter, the Game Manager may request the unmounting or unloading of a current game and/or the loading or mounting of a new game. For example, as illustrated in FIG. 16, when a request from the download manager is received (1610), the request may be identified (1612), and an appropriate response may be initiated. If the request corresponds to a request to unmount a specified game (1618), the specified game may be automatically unmounted (1620) from the system memory, and its associated file entries removed from the cached file list. If the request corresponds to a request to mount a specified game (1614), the specified game may be automatically mounted (1616) into the system memory, and its associated file entries added to the cached file list.

Examples of Specific Power Hit Considerations

As described previously, authentication errors may be detected as a result of one or more power hits (e.g., power outages) which have occurred during file/image transfer operations such as, for example: when the Download Manager is downloading files/images from a remote server; when the Download Manager is copying or moves files/images from Download folder to Staging folder; when the Authenticator copies or moves files/images from Staging folder to Active folder; etc. Accordingly, one aspect of the present invention is directed to different techniques which may be used for adequately recovering from unanticipated power hits.

For example, in one implementation, when a power hit occurs while the Download Manager is downloading files/images, the Authenticate may discover that the files/images are not authentic when performing authentication of the downloaded files/images. As a result, in one embodiment, the Authenticator may remove the non-authenticated files/images from the Download folder. Additionally, the Download Manager may be configured or designed to check to see whether the downloading operations have been completed successfully. If it is determined that the downloading operations have not been completed successfully, attempts may be made to resume the remainder of the download transactions and/or to restart the downloading of the identified files/images.

If a power hit occurs while files are being moved from Download folder to the Staging folder or from the Staging folder to the Active folder, the Authenticator may detect one or more of the following conditions during initialization/boot up:

(1) No images and/or certificate files showing up under the Staging folder. In this situation, the Authenticator may simply boot the system from Active folder, assuming that everything on hard drive has been authenticated (as described, for example, in FIG. 14).

(2) All pairs of image and certificate files are successfully moved to the Staging folder. In this situation, the Authenticator may move the file/image pairs from the Staging folder to the Active folder, and then boot the system from Active after the authentication passes (as described, for example, in FIG. 14).

(3) Some of the pairs of image and certificate files are moved successfully into the Staging folder, while the other images/files remain in the Download folder. However, no broken pairs are detected in either folder. In this situation, the Authenticator may move the file/image pairs from the Staging folder to the Active folder, and then boot the system from the Active folder after the authentication passes (as described, for example, in FIG. 14).

(4) Some of the pairs are moved to Staging folder, but at least one file/image in the Staging folder is identified as to a broken file/image pair. In this situation, the Authenticator may attempt to identify and locate the missing file/image (of the file/image pair). Once the missing file has been identified and located, the Authenticator may then attempt to move at least one of the files/images of the file/image pair so that all associated file/image pairs are located under the same folder/directory. For example, if the package file of a "package/certificate" file pair is detected in the Staging folder while its associated .certificate file is detected in the Download folder, the Authenticator may attempt to move the .certificate file to the Staging folder, whereupon the files/images in the Staging folder may then be further processed, as shown, for example, in FIG. 13. In another example, if the .package file of a "package/certificate" file pair is detected in the Staging folder while its associated .certificate file is detected in the Active folder, the Authenticator may attempt to move the .package file to the Active folder. Thereafter, the system may be booted from the Active folder after it has been successfully authenticated (as described, for example, in FIG. 14).

Other Embodiments

According to different embodiments, the technique of the present invention may be implemented on a variety of gaming systems which may employ different types of file systems. Examples of different types of file systems include: stateful file systems, stateless file systems, transactional file systems, non-transactional file systems, etc. For example, a specific embodiment of the present invention may be implemented in a transactional-based file system for ensuring the integrity and completion of all atomic transactions. In such an embodiment, the technique of the present invention may be adapted to detect and resume any interrupted atomic transactions (which, for example, may have occurred due to a power hit) until they are successfully completed.

It will be appreciated that the technique of the present invention provides different mechanisms for: securely downloading specified files/images from a remote server to the gaming machine; merging or transferring downloaded files/images into appropriate locations within the gaming system memory without breaking authentication requirements (such as, for example, allowing a non-authenticated file/image to be executed or mounted into memory); downloading and installing at the gaming machine system-related, game-related and/or peripheral-related images/files without breaking authentication; automatically handling non-authenticated files/images such as those which may result from a power hit during file/image downloading operations and/or during file/image moving/copying operations; etc. In this way, the technique of the present invention is able to provide a self-diagnostic system for ensuring authenticated, atomic transactions, and for automatically handling detected error conditions. Additionally, the technique of the present invention provides the ability for a gaming machine to be automatically and seamlessly updated at runtime. For example, in at least one implementation, a gaming machine utilizing the technique of the present invention may be configured or designed to download system-related, game-related, peripheral-related, and/or other types of files/images from a remote server during normal modes of operation of the gaming machine such as, for example, attract mode, game play mode, bonus mode, etc. Additionally, the gaming machine may also be configured or designed to authenticate and/or install downloaded files/images normal modes of operation.

In addition to the benefits and advantages described above, the technique of the present invention may also be adapted to provide other features, benefits, and advantages which are not provided by conventional gaming machine systems. For example, specific embodiments of the present invention may be adapted to provide one or more of the following features: the ability to automatically and dynamically mount and/or unmount individually selectable games at the gaming machine during runtime; the ability to mount and/or unmount selected games at the gaming machine without requiring a reboot of the system O/S; the ability to maintain system data (such as, for example, historical data, accounting data, meter data, etc.) during the mounting and/or unmounting of selected games at the gaming machine; the ability to mount multiple different games at the gaming machine; the ability to perform compatibility analysis of selected game components, operating system components, and/or peripheral components before installation of such components at the gaming machine; etc.

As commonly known to one having ordinary skill in the art, conventional gaming machine systems are typically not able to provide any or all of the above-described features. For example, in conventional gaming machine systems, the game code software is typically bundled with the operating system (OS) software as a single package or image, and installed in a conventional gaming machine. According to conventional wisdom, it is desirable to bundle the game code software and operating system software in this manner in order to ensure compatibility between the game code software and operating system software since conventional gaming machines are not provided with any mechanism for determining or verifying compatibility between system-related components and game-related components. Accordingly, in order to install and mount a new game in a conventional gaming machine using conventional techniques, a new game-O/S image (which includes the game code software and O/S software) must be installed at the gaming machine. The gaming machine must then be rebooted in order to boot the new O/S software and game code software. However, the rebooting of the gaming machine and O/S typically results in the loss of any previously accumulated system data (such as, for example, historical data, accounting data, meter data, etc.). Thus, using conventional techniques, the installing and mounting of a new game in a conventional gaming machine typically results in the loss of any previously accumulated system data.

Typically, at least a portion of the gaming machine system data is tracked using one or more internal meters, of which there are typically several in any given gaming machine. Such meters can be mechanical, electrical or electromechanical, and are used to track a variety of items associated with each gaming machine, many of which tend to be accounting type items. Many of these accounting type meters are typically adapted to count and record one or more accounting items in real-time, and many are highly regulated by various gaming jurisdictions and authorities. Such gaming jurisdictions and authorities typically prefer or demand that actual physical metering devices be present for auditing purposes at every gaming machine or terminal in service, and tend to restrict how electronic or processor based meters may be devised and implemented. Various communication protocols and other details for devising and implementing electronic meters and data files within a gaming device, as well as interfacing with or forwarding communications from such meters and files along a network can be found in, for example, commonly owned U.S. Pat. No. 5,655,961 to Acres, et al.; U.S. Pat. No. 6,682,423 to Brosnan; U.S. Pat. No. 6,712,698 to Paulsen, et al.; U.S. Pat. No. 6,800,029 to Rowe, et al. and U.S. Pat. No. 6,804,763 to Stockdale, et al.; as well as U.S. patent application Ser. No. 10/040,239 to LeMay, et al. and Ser. No. 10/246,373 to Hedrick, et al., with each of the foregoing seven references being incorporated herein in its entirety and for all purposes.

Specific examples of accounting meters can include, for instance, history meters, transaction meters, vended meters, bookkeeping meters, and credit meters, among others, one or more of which can be in the form of "soft" or battery backed RAM type meters. One or more bookkeeping meters for a given gaming machine can include data on items, such as, for example, coins accepted, coin credits, bills accepted, bill credits, total in, total out, combined drop, and attendant payouts, among others.

In addition to storing meter information, the battery backed RAM (or non-volatile RAM) may also be configured or designed to store other types of system data such as, for example: historical game data, file download log, file upload logs, configuration information, system meters, game meters, protocol configurations, validation information, etc. Examples of historical game data include: total games played; total credits wagered; total game play time; total hold time; game outcome(s); bonus initiator(s); bonus game outcome(s); double up attempt(s); double up amount(s); double up outcome(s); game names; progressive hit information; progressive award names; game play dates and times; etc.

In contrast to conventional techniques, the technique of the present invention may be used to provide a gaming machine with the ability to automatically and dynamically mount and/or unmount individually selectable games during runtime.

According to at least one embodiment, the removal of a specified game from the gaming machine may not necessarily involve a total removal of the game's associated components. For example, in one implementation, portions of the game code and/or other game information relating to the specified game may be retained for subsequent use by other components of the gaming machine. Thus, for example, a presentation component or some portion of the presentation component (associated with a game that has been targeted for removal) may be retained for subsequent use by other gaming machine components such as, for example, newly installed game components, game history components (e.g., for displaying animated graphical game play history), etc. Additionally, in one implementation, the retained or remnant portions of game code/information (e.g., associated with a game that has been removed) may be automatically removed upon determining that they are no longer needed. For example, in some gaming jurisdictions, "old" historical data (e.g., relating to removed games) is not required to be retained once a new game has been mounted at the gaming machine. Accordingly, in such jurisdictions, the retained or remnant portions of game code/information may be temporarily retained (e.g., for auditing purposes), and may be automatically removed after a new game has been successfully mounted at the gaming machine.

In addition to the benefits and features described above, the technique of the present invention also provides additional benefits/features which are not provided by conventional gaming machines. For example, one benefit provided by the technique of the present invention is that the mounting and/or unmounting of selected games may be performed during runtime of the gaming machine and without rebooting the O/S. Accordingly, another benefit of the technique of the present invention is that the mounting and/or unmounting of selected games may be performed without losing any accumulated system data.

According to conventional techniques, casino game software which is to be installed and mounted in a conventional gaming machine is typically bundled with compatible operating system software and provided to casinos in the form of a single image file which includes both the game code software and compatible operating system software. In order to mount the game at a conventional gaming machine, the operating system software that was bundled with the game code software must be loaded into the working memory (e.g., RAM) of the gaming machine, which typically requires A re-boot of the operating system.

However, as described previously, the technique of the present invention provides the ability for a gaming machine to perform compatibility checks of various files/images, for example, to help ensure proper compatibility between the various gaming machine components, peripherals, and games. For example, in one implementation at least a portion of the files/images stored in the system storage 1010 may include compatibility information which, for example, may be used for determining compatibility criteria for subsequent game downloads and installation. This ability to perform compatibility verification of various gaming machine components, peripherals, and games provides the added benefit of allowing game code software to be decoupled or de-bundled from operating system software such that each different type of software (e.g., game code software, operating system software, peripheral software, etc.) may be independently downloaded, installed and/or mounted at the gaming machine.

Thus, for example, using the technique of the present invention, new game code software may downloaded and mounted at the gaming machine without necessarily having to install or load new operating system software into the working memory (e.g., RAM) of the gaming machine. As a result, using the technique of the present invention, it is now possible mount and/or unmount selected games at the gaming machine during runtime, without having to reboot the O/S, and without losing any accumulated system data.

The following example helps to illustrate at least some of the above-described benefits/features of the present invention. In this example, it is initially assumed that a gaming machine implementing the technique of the present invention has already performed required authentication procedures, booted up its operating system software, and mounted a first game for game play. At this point, it is assumed that the gaming machine receives instructions (e.g., from a remote server) to unmount the first game, and mount a new, second game using game-related files/images stored on a remote game server. In response to the instructions, the Download Manager may cause the game-related files/images to be downloaded from the game server to the Download folder of the system storage. In at least one implementation, the downloaded game-related files include compatibility information for facilitating compatibility analysis with other hardware/software components of the gaming machine system. Additionally, in at least one implementation, the downloaded game-related files are not bundled with and/or do not include system-related files. The game-related files/images may then be authenticated and checked for compatibility to ensure that they are compatible with the current operating system software of the gaming machine.

In one implementation, if the game-related files/images are determined not to be compatible with at least a portion of the current gaming system components, the mounting of the new game may be temporarily suspended until the identified non-compatible gaming system components have been upgraded to be compatible with the new game. In one implementation, the System Manager may be configured or designed to automatically handle tasks relating to the upgrading of the non-compatible gaming system components which, for example, may involve coordinating with the Download Manager to download new or updated system-related files/images from a remote server. During this time, the downloaded game-related files/images may be moved to the Staging folder to await further processing.

Assuming that the game-related files/images are determined to be compatible with the currently installed gaming system components, the Game Manager may proceed with initiating the unmounting the current (first) game, and the mounting the new (second) game. As stated previously, the mounting and/or unmounting of one or more games at the gaming machine may be performed during runtime, without rebooting the O/S, and/or without erasing or losing any desirable system data.

In at least one implementation, the gaming machine may be configured or designed to respond to input signals for entering and exiting a game configuration mode of operation in which game play is disabled, and the mounting and/or unmounting of selected game components (e.g., game code) is permitted.

In addition to providing a gaming machine with the ability to mount and/or unmount individually selectable games during runtime, the technique of the present invention may also provide a gaming machine with the ability to mount multiple different games during runtime. For example, in one implementation the gaming machine may be configured or designed to allow several different games (e.g., video poker, video blackjack, video keno) to be mounted into the system memory (e.g., RAM) concurrently. A player may then be presented with the option to select one of the mounted games for game play on that gaming machine. In at least one implementation the internal meters and/or other system component of the gaming machine may be adapted to keep track of desired statistics relating to each of the games which are concurrently mounted in the system memory.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A method for facilitating dynamic configuration of a gaming machine configured to receive a wager on a game of chance, the method comprising:

mounting a first game into memory of the gaming machine during runtime of the gaming machine, wherein runtime of the gaming machine includes enabling executing and processing of software code of the first game by utilizing a first executable space configured to store the software code of the first game being executed;

receiving game mounting instructions for mounting a second game into the gaming machine memory by utilizing a second executable space or sufficient other memory to receive and temporarily store software code of the second game while the software code of the first game is being executed in the first executable space;

automatically mounting the second game into the gaming machine memory in response to said game mounting instructions;

wherein the mounting of the second game occurs during runtime of the gaming machine;

wherein mounting includes expanding all directories contained within a game, comparing the directories and their contents with trusted gaming information, and loading the expanded directories and contents thereof into the gaming machine memory;

receiving game removal instructions for removing the first game from the gaming machine memory;

automatically removing a first portion of components associated with the first game from the gaming machine memory in response to said game removal instructions, wherein the removing of the first portion of components occurs during runtime of the gaming machine; and retaining a second portion of components associated with the first game in the gaming machine memory after the removal of the first portion of components, wherein the second portion of components is used by the second game.

2. The method of claim 1 wherein the first and second games are concurrently mounted into the gaming machine memory.

3. The method of claim 1 further comprising:

receiving game unmounting instructions for unmounting the first game from the gaming machine memory; and automatically unmounting the first game from the gaming machine memory in response to said game unmounting instructions;

wherein the unmounting of the first game occurs during runtime of the gaming machine.

4. The method of claim 1 further comprising:

automatically removing the second portion of components from the gaming machine memory in response to determining that the second portion of components is no longer needed, wherein the removing of the second portion of components occurs during runtime of the gaming machine.

5. The method of claim 1 wherein the runtime of the gaming machine occurs after an operating system of the gaming machine has been booted up.

6. The method of claim 1 further comprising:

dynamically mounting the second game without rebooting the operating system.

7. The method of claim 1 wherein the gaming machine includes non-volatile memory for storing accumulated system data, the method further comprising:

mounting the second game while preserving a first portion of accumulated system data stored in the non-volatile memory.

8. The method of claim 7 wherein the first portion of accumulated system data includes gaming machine accounting data tracked over a first time period.

9. The method of claim 7 wherein the first portion of accumulated system data includes meter data tracked over a first time period.

10. The method of claim 1 further comprising:

determining, before the mounting of said second game, whether the second game is compatible with a first portion of system components currently installed at the gaming machine.

11. The method of claim 10 wherein the first portion of system components includes the gaming machine operating system.

12. A method for facilitating dynamic configuration of a gaming machine configured to receive a wager on a game of chance, the method comprising:

mounting a first game into memory of the gaming machine during runtime of the gaming machine, wherein runtime of the gaming machine includes enabling executing and processing of software code of the first game by utilizing a first executable space configured to store the software code of the first game being executed;

wherein mounting includes expanding all directories contained within a game, comparing the directories and their contents with trusted gaming information, and loading the expanded directories and contents thereof into the gaming machine memory;

receiving game unmounting instructions for unmounting the first game from the gaming machine memory automatically removing a first portion of components associated with the first game from the gaming machine memory in response to said game unmounting instructions, wherein the removing of the first portion of components occurs during runtime of the gaming machine; and retaining a second portion of components associated with the first game in the gaming machine memory after the removal of the first portion of components; and automatically removing the second portion of components from the gaming machine memory when a new game has been successfully mounted in the gaming machine.

13. The method of claim 12 wherein the unmounting of the first game occurs during runtime of the gaming machine.

14. The method of claim 12 further comprising:

receiving game mounting instructions for mounting a second game into the gaming machine memory; and automatically mounting the second game into the gaming machine memory in response to said game mounting instructions by utilizing a second executable space or sufficient other memory to receive and temporarily store software code of the second game while the software code of the first game is being executed in the first executable space;

wherein the mounting of the second game occurs during runtime of the gaming machine.

15. The method of claim 12 wherein the runtime of the gaming machine occurs after an operating system of the gaming machine has been booted up.

16. The method of claim 12 further comprising:

dynamically unmounting the first game without rebooting the operating system.

17. The method of claim 12 wherein the gaming machine includes non-volatile memory for storing accumulated system data, the method further comprising:

unmounting the first game while preserving a first portion of accumulated system data stored in the non-volatile memory.

18. A method for facilitating dynamic configuration of a gaming machine configured to receive a wager on a game of chance, the method comprising:

downloading a first image from a remote server, wherein the first image includes a first portion of update information to be used for updating system-related information stored at the gaming machine;

storing the downloaded first image in memory at the gaming machine;

dynamically updating, during runtime of the gaming machine, a first portion of the system-related information using the first portion of update information wherein runtime of the gaming machine includes enabling executing and processing of software code of a first game by utilizing a first executable space configured to store the software code of the first game being executed, wherein the first game is mounted in the memory, and the first game uses a first portion of components included in the first image;

receiving game mounting instructions for mounting a second game into the memory by utilizing a second executable space or sufficient other memory to receive and temporarily store software code of the second game while the software code of the first game is being executed in the first executable space;

automatically mounting the second game into the memory in response to said game mounting instructions;

wherein the mounting of the second game occurs during runtime of the gaming machine;

wherein mounting includes expanding all directories contained within a game, comparing the directories and their contents with trusted gaming information, and loading the expanded directories and contents thereof into the gaming machine memory;

receiving game removal instructions for removing the first game from the memory;

automatically removing the first portion of components included in the first image from the memory in response to said game removal instructions, wherein the removing of the first portion of components occurs during runtime of the gaming machine; and retaining a second portion of components included in the first image in the memory after the removal of the first portion of components, wherein the second portion of components is used by the second game.

19. The method of claim 18:

wherein the first portion of system-related information is used for initializing at least one system-related component of the gaming machine; and wherein the updating of the first portion of system-related information results in an update of the at least one system-related component.

20. The method of claim 18 further comprising:

authenticating the first image during runtime of the gaming machine.

21. The method of claim 18 wherein the runtime of the gaming machine occurs after an operating system of the gaming machine has been booted up.

22. The method of claim 18 further comprising:

detecting a first error relating to the downloaded first image;

determining that a cause of the first error relates to an incomplete transaction associated with the downloaded first image; and automatically initiating first error handling response in response to the detecting of the first error, wherein the first error handling response includes initiating completion of the of the incomplete transaction associated with the downloaded first image.

23. The method of claim 22 wherein the error occurred as a result of a temporary power loss at the gaming machine.

24. A gaming machine configured to receive a wager on a game of chance, the gaming machine comprising:

at least one processor;

at least one interface configured to provide a communication link to at least one other network device in the data network; and memory;

the gaming machine being configured to:

receive game mounting instructions to mount a first game into memory of the gaming machine during runtime of the gaming machine, wherein runtime of the gaming machine includes enabling executing and processing of software code of the first game by utilizing a first executable space configured to store the software code of the first game being executed;

wherein game mounting instructions include expanding all directories contained within a game, comparing the directories and their contents with trusted gaming information, and loading the expanded directories and contents thereof into the gaming machine memory;

mount a first game into memory of the gaming machine during runtime of the gaming machine;

receive game mounting instructions for mounting a second game into the gaming machine memory by utilizing a second executable space or sufficient other memory to receive and temporarily store software code of the second game while the software code of the first game is being executed in the first executable space; and automatically mount the second game into the gaming machine memory in response to said game mounting instructions;

wherein the mounting of the second game occurs during runtime of the gaming machine;

receive game removal instructions for removing the first game from the gaming machine memory; and automatically remove a first portion of components associated with the first game from the gaming machine memory in response to said game removal instructions, wherein the removing of the first game occurs during runtime of the gaming machine; and retain a second portion of components associated with the first game in the gaming machine memory after the removal of the first portion of components, wherein the second portion of components is used by the second game.

25. The gaming machine of claim 24 wherein the first and second games are concurrently mounted into the gaming machine memory.

26. The gaming machine of claim 24 being further configured to:

receive game unmounting instructions for unmounting the first game from the gaming machine memory; and automatically unmount the first game from the gaming machine memory in response to said game unmounting instructions;

wherein the unmounting of the first game occurs during runtime of the gaming machine.

27. The gaming machine of claim 24 being further configured to:

automatically remove the second portion of components from the gaming machine memory in response to determining that the second portion of components is no longer needed, wherein the removing of the second portion of components occurs during runtime of the gaming machine.

28. The gaming machine of claim 24 wherein the runtime of the gaming machine occurs after an operating system of the gaming machine has been booted up.

29. The gaming machine of claim 24 being further configured to:

dynamically mount the second game without rebooting the operating system.

30. The gaming machine of claim 24 wherein the gaming machine includes non-volatile memory for storing accumulated system data, the gaming machine being further configured to:

mount the second game while preserving a first portion of accumulated system data stored in the non-volatile memory.

31. The gaming machine of claim 30 wherein the first portion of accumulated system data includes gaming machine accounting data tracked over a first time period.

32. The gaming machine of claim 30 wherein the first portion of accumulated system data includes meter data tracked over a first time period.

33. The gaming machine of claim 24 being further configured to:

determine, before the mounting of said second game, whether the second game is compatible with a first portion of system components currently installed at the gaming machine.

34. The gaming machine of claim 33 wherein the first portion of system components includes the gaming machine operating system.

35. A gaming machine configured to receive a wager on a game of chance, the gaming machine comprising:

at least one processor;

at least one interface configured or designed to provide a communication link to at least one other network device in the data network; and memory;

the gaming machine being configured or designed to:

receive game mounting instructions to mount a first game into memory of the gaming machine during runtime of the gaming machine, wherein runtime of the gaming machine includes enabling executing and processing of software code of the first game by utilizing a first executable space configured to store the software code of the first game being executed;

wherein game mounting instructions include expanding all directories contained within a game, comparing the directories and their contents with trusted gaming information, and loading the expanded directories and contents thereof into the gaming machine memory;

receive game mounting instructions to mount a second game into the gaming machine memory by utilizing a second executable space or sufficient other memory to receive and temporarily store software code of the second game while the software code of the first game is being executed in the first executable space;

automatically mount the second game into the gaming machine memory in response to the game mounting instructions;

receive game unmounting instructions for unmounting the first game from the gaming machine memory;

automatically remove a first portion of components associated with the first game from the gaming machine memory in response to said game unmounting instructions, wherein the removal of the first portion of components occurs during runtime of the gaming machine; and retain a second portion of components associated with the first game in the gaming machine memory after the removal of the first portion of components; and remove the second portion of components from the gaming machine memory when u new the second game has been successfully mounted in the gaming machine, wherein the second portion of components comprises a presentation component associated with the first game, and the presentation component is retained for subsequent use by the second game.

36. The gaming machine of claim 35 wherein the unmounting of the first game occurs during runtime of the gaming machine.

37. The gaming machine of claim 35 being further configured to:

receive game mounting instructions for mounting the second game into the gaming machine memory; and automatically mount the second game into the gaming machine memory in response to said game mounting instructions;

wherein the mounting of the second game occurs during runtime of the gaming machine.

38. The gaming machine of claim 35 wherein the runtime of the gaming machine occurs after an operating system of the gaming machine has been booted up.

39. The gaming machine of claim 35 being further configured to:

dynamically unmount the first game without rebooting the operating system.

40. The gaming machine of claim 35 wherein the gaming machine includes non-volatile memory for storing accumulated system data, the gaming machine being further configured to:

unmount the first game while preserving a first portion of accumulated system data stored in the non-volatile memory.

41. A gaming machine configured to receive a wager on a game of chance, the gaming machine comprising:

at least one processor;

at least one interface configured or designed to provide a communication link to at least one other network device in the data network; and memory;

the gaming machine being configured or designed to:

download a first image from a remote server, wherein the first image includes a first portion of update information to be used for updating system-related information stored at the gaming machine;

store the downloaded first image in memory at the gaming machine; and dynamically update, during runtime of the gaming machine, a first portion of the system-related information using the first portion of update information, wherein a first game is mounted in the memory according to game mounting instructions previously received during runtime of the gaming machine, and the first game uses a first portion of components included in the first image, wherein runtime of the gaming machine includes enabling executing and processing of software code of a game by utilizing a first executable space configured to store the software code of the game being executed;

wherein game mounting instructions include expanding all directories contained within a game, comparing the directories and their contents with trusted gaming information, and loading the expanded directories and contents thereof into the gaming machine memory;

receive game mounting instructions for mounting a second game into the memory by utilizing a second executable space or sufficient other memory to receive and temporarily store software code of the second game while the software code of the first game is being executed in the first executable space;

automatically mount the second game into the memory in response to said game mounting instructions;

wherein the second game is mounted during runtime of the gaming machine;

receive game removal instructions for removing the first game from the memory;

automatically remove the first portion of components included in the first image from the memory in response to said game removal instructions, wherein the removal of the first portion of components occurs during runtime of the gaming machine; and retain a second portion of components included in the first image in the memory after the removal of the first portion of components, wherein the second portion of components is used by the second game.

42. The gaming machine of claim 41:

wherein the first portion of system-related information is used for initializing at least one system-related component of the gaming machine; and wherein the updating of the first portion of system-related information results in an update of the at least one system-related component.

43. The gaming machine of claim 41 being further configured to:

authenticate the first image during runtime of the gaming machine.

44. The gaming machine of claim 41 wherein the runtime of the gaming machine occurs after an operating system of the gaming machine has been booted up.

45. The gaming machine of claim 41 being further configured or designed to:

detect a first error relating to the downloaded first image;

determine that a cause of the first error relates to an incomplete transaction associated with the downloaded first image; and automatically initiate first error handling response in response to the detecting of the first error, wherein the first error handling response includes initiating completion of the of the incomplete transaction associated with the downloaded first image.

46. The gaming machine of claim 45 wherein the error occurred as a result of a temporary power loss at the gaming machine.

47. The method of claim 1, wherein the second portion of components comprises a presentation component associated with the first game, and the presentation component is retained for subsequent use by the second game.

48. The method of claim 47, wherein the presentation component is used by the second game to display graphical game play history.

49. The method of claim 12, wherein the gaming machine is located in a jurisdiction in which historical data relating to removed games is not required to be retained once a new game has been mounted in the gaming machine, and the second portion of components comprises historical data relating to the first game.

50. A method of downloading program images to an electronic gaming machine, the method comprising:

receiving game mounting instructions for mounting a game into a memory of the gaming machine;

downloading an image from a remote server in response to receiving the game mounting instructions;

storing the image in a group of files comprising at least a first file and a second file, wherein at least a portion of the image is stored in each of the files in the group, and the files are stored on a file system of a storage medium;

wherein the group of files is associated with a first storage area in the file system;

moving the group of files from the first storage area to a second storage area in the file system;

authenticating the group of files;

moving the group of files from the second storage area to a third storage area in the file system in response to successful authentication of the files;

receiving the image of the game from the group of files; and mounting the image of the game in the memory of the gaming machine during runtime of the gaming machine, wherein runtime of the gaming machine includes enabling executing and processing of software code of the game by utilizing a first executable space configured to store the software code of the first game being executed;

wherein mounting includes expanding all directories contained within a game, comparing the directories and their contents with trusted gaming information, and loading the expanded directories and contents thereof into the gaming machine memory;

receiving game mounting instructions for mounting a second game into the gaming machine memory by utilizing a second executable space or sufficient other memory to receive and temporarily store software code of the second game while the software code of the first game is being executed in the first executable space; and automatically mounting the second game into the gaming machine memory in response to the game mounting instructions.

51. The method of claim 50, further comprising:

verifying the integrity of the first, second, and third storage areas; and repairing at least one broken file pair when at least one broken file pair is found in at least one of the storage areas.

52. The method of claim 51, wherein verifying comprises searching for a first paired file from the group of files in one of the storage areas, wherein at least one second paired file from the group of files is located in a storage area different from that of the first paired file, and repairing the at least one broken file pair comprises moving the first paired file to the storage area in which the second paired file is stored.

53. The method of claim 50, wherein the first, second, and third storage areas comprise folders in the file system.

* * * * *

UNITED STATES PATENT AND TRADEMARK OFFICE

CERTIFICATE OF CORRECTION

PATENT NO. : 8,033,913 B2
APPLICATION NO. : 11/223755
DATED : October 11, 2011
INVENTOR(S) : Cokerille et al.

It is certified that error appears in the above-identified patent and that said Letters Patent is hereby corrected as shown below:

In line 43 of claim 35 (column 45, line 65), change “when u new the second game” to --when the second game--.

In line 19 of claim 50 (column 48, line 19), change “the group of files; and” to --the group of files;--.

Signed and Sealed this
Twelfth Day of March, 2013

Teresa Stanek Rea
*Acting Director of the United States Patent and Trademark Office*